US012767586B2

(12) United States Patent
Yoshimoto

(10) Patent No.: US 12,767,586 B2
(45) Date of Patent: Oct. 20, 2026

(54) OPTICAL GLASS, OPTICAL ELEMENT, OPTICAL SYSTEM, INTERCHANGEABLE LENS, AND OPTICAL DEVICE

(71) Applicant: NIKON CORPORATION, Tokyo (JP)

(72) Inventor: Kohei Yoshimoto, Kawasaki (JP)

(73) Assignee: NIKON CORPORATION, Tokyo (JP)

( * ) Notice: Subject to any disclaimer, the term of this patent is extended or adjusted under 35 U.S.C. 154(b) by 1235 days.

(21) Appl. No.: 17/665,092

(22) Filed: Feb. 4, 2022

(65) Prior Publication Data

US 2022/0227660 A1 Jul. 21, 2022

Related U.S. Application Data

(63) Continuation of application No. PCT/JP2019/030811, filed on Aug. 6, 2019.

(51) Int. Cl.

| | |
|---|---|
| ***C03C 3/247*** | (2006.01) |
| ***G02B 1/00*** | (2006.01) |
| ***G02C 7/08*** | (2006.01) |

(52) U.S. Cl.

CPC ................ *C03C 3/247* (2013.01); *G02B 1/00* (2013.01); *G02C 7/08* (2013.01)

(58) Field of Classification Search

CPC .......... C03C 3/247; G02B 1/00; G02B 21/16; G02C 7/08

See application file for complete search history.

(56) References Cited

U.S. PATENT DOCUMENTS

2015/0299030 A1 10/2015 Tezuka

FOREIGN PATENT DOCUMENTS

| | | | | |
|---|---|---|---|---|
| CN | 105036549 | | 11/2015 | |
| DE | 4132258 | | 11/1992 | |
| EP | 2939986 | | 10/2016 | |
| FR | 2681854 | | 9/1992 | |
| JP | 1-219038 | | 9/1989 | |
| JP | 5-208842 | | 8/1993 | |
| JP | 5-208842 | A | 8/1993 | |
| JP | 10-53434 | | 2/1998 | |
| JP | 10-53434 | A | 2/1998 | |
| JP | 11-60267 | | 3/1999 | |
| JP | 11-60267 | A | 3/1999 | |
| JP | 2009-286670 | | 12/2009 | |
| JP | 2012-126603 | | 7/2012 | |
| JP | 2012-126608 | | 7/2012 | |
| JP | 2012126603 | A * | 7/2012 | ............. C03C 3/247 |
| JP | 2015-205785 | | 11/2015 | |

OTHER PUBLICATIONS

CN Office Action dated Aug. 2, 2024 for counterpart Chinese Application No. 201980100735.2.

Chinese Office Action dated Apr. 8, 2024 for counterpart Chinese Application No. 201980100735.2.

(Continued)

*Primary Examiner* — Shuangyi Abu Ali

(57) ABSTRACT

The present disclosure provides an optical glass including: by cation %, 30% to 45% of a $P^{5+}$ component; 10% to 20% of an $Al^{3+}$ component; and 20% to 40% of a $Ba^{2+}$ component, and, by anion %, 75% to 95% of an $O^{2-}$ component; and 5% to 25% of an $F^{-}$ component.

15 Claims, 5 Drawing Sheets

(56) References Cited

OTHER PUBLICATIONS

European Office Action dated Apr. 22, 2024 for counterpart European Application No. 19940611.7.
Japanese Office Action dated Jun. 13, 2023 for counterpart Japanese Application No. 2021-538579.
Chinese Office Action dated Nov. 8, 2023 for counterpart Chinese Application No. 201980100735.2.
International Search Report, dated Oct. 29, 2019, in International Application No. PCT/JP2019/030811 (4 pp.).
Japanese Office Action dated Jun. 11, 2024 for Japanese Application No. 2023-196489.
Extended European Search Report dated Apr. 4, 2023 for European Applicaton No. 19940611.7.
Chinese Office Action issued Jan. 11, 2026 for Application No. 201980100735.2.
Chinese Office Action issued Apr. 2, 2026 for Application No. 201980100735.2.
Extended European Search Report issued Mar. 3, 2026 for Application No. 25219664.7.

* cited by examiner

OPTICAL GLASS, OPTICAL ELEMENT, OPTICAL SYSTEM, INTERCHANGEABLE LENS, AND OPTICAL DEVICE

CROSS REFERENCE TO RELATED APPLICATIONS

This application is a continuation application, filed under 35 U.S.C. § 111 (a), of International Application PCT/JP2019/030811, filed Aug. 6, 2019, the contents of which are incorporated herein by reference.

TECHNICAL FIELD

The present invention relates to an optical glass, an optical element, an optical system, an interchangeable lens, and an optical device.

BACKGROUND ART

In development of digital cameras, for example, an optical glass having a high refractive index and low dispersion, which is disclosed in JP 2009-286670 A, is used in an optical system used for a digital camera.

CITATION LIST

Patent Literature

PTL 1: JP 2009-286670 A

SUMMARY

A first aspect according to the present invention is an optical glass including: by cation %, 30% to 45% of a $P^{5+}$ component; 10% to 20% of an $Al^{3+}$ component; and 20% to 40% of a $Ba^{2+}$ component, and, by anion %, 75% to 95% of an $O^{2-}$ component; and 5% to 25% of an $F^-$ component.

A second aspect according to the present invention is an optical element using the optical glass described above.

A third aspect according to the resent invention is an optical system including the optical element described above.

A fourth aspect according to the present invention is an interchangeable lens including the optical system described above.

A fifth aspect according to the present invention is an optical device including the optical system described above.

DETAILED DESCRIPTION

Figure 1:
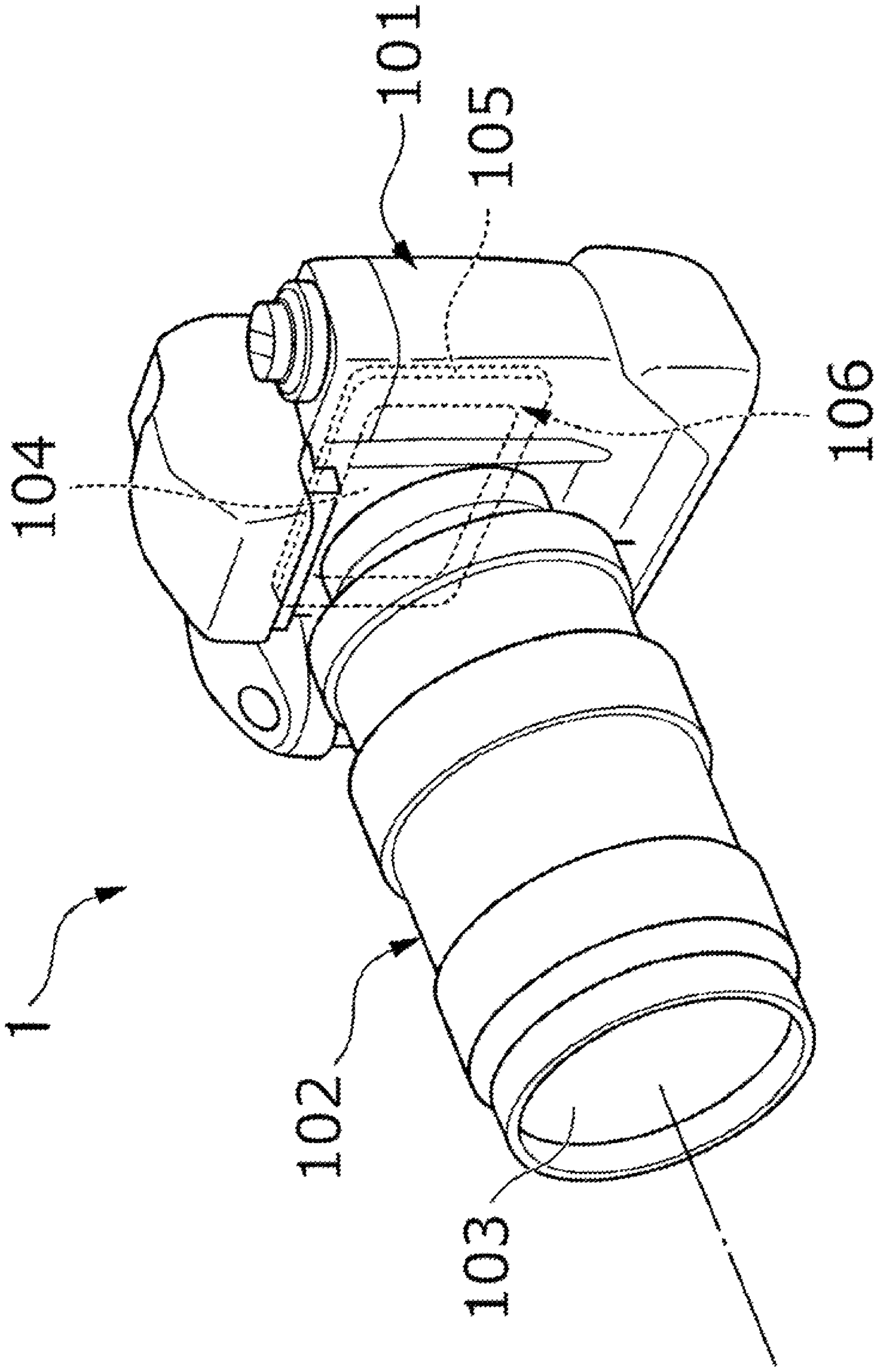
FIG. 1 is a perspective view of an imaging device including an optical element using an optical glass according to the present embodiment.

Hereinafter, description is made on an embodiment of the present invention (hereinafter, referred to as the "present embodiment"). The present embodiment described below is an example for describing the present invention, and is not intended to limit the present invention to the contents described below.

An optical glass according to the present embodiment is an optical glass including: by cation %, 30% to 45% of a $P^{5+}$ component; 10% to 20% of an $Al^{3+}$ component; and 20% to 40% of a $Ba^{2+}$ component, and, by anion %, 75% to 95% of an $O^{2-}$ component; and 5% to 25% of an $F^-$ component.

In the present specification, a percentage content of each component is expressed by cation % or anion % based on a molar ratio unless otherwise stated.

The optical glass according to the present embodiment has a high refractive index, low dispersion, and high abnormal dispersibility. Then, the optical glass according to the present embodiment can exhibit excellent properties without containing an expensive component, and can thus be produced at a low cost. The optical glass according to the present embodiment not only has an excellent optical constant, but can also suppress occurrence of a stria inside a glass and has high devitrification resistance.

Furthermore, as one of suitable aspects of the present embodiment, the optical glass having high positive abnormal dispersibility while maintaining a high refractive index can be acquired. For example, there is a problem that a conventional optical glass having positive abnormal dispersibilty cannot have a high refractive index, and is difficult to achieve both of power (refractive power) when being used for a convex lens and the like and a correction capacity of chromatic aberration. The optical glass according to the present embodiment can solve such a problem, can also be applied to various uses, and can sufficiently meet the needs at a practical level.

When an abbe number of an optical glass increases (low dispersion is caused), a refractive index generally decreases. However, in view of the circumstance described above, a "high refractive index" in the present embodiment includes that a refractive index is relatively higher than that of a general optical glass having a similar abbe number, and does not necessarily mean only that an absolute value of a refractive index is great.

(Cation Component)

$P^{5+}$ is a component that forms a glass frame, and improves devitrification resistance. When the content amount of $P^{5+}$ is excessively small, devitrification resistance is liable to be degraded. When the content amount of $P^{5+}$ is excessively great, a refractive index is liable to be reduced. From such a viewpoint, the content amount of $P^{5+}$ is from 30% to 45%. Then, an upper limit thereof is preferably 41% and more preferably 40%. A lower limit thereof is preferably 37% and more preferably 39%.

Note that B is generally used as a component that forms a glass frame. However, in the optical glass according to the present embodiment, $B^{3+}$ reacts with $F^-$ to generate a volatile substance such as $BF_3$, and thus deterioration of quality of the optical glass may be caused. From such a viewpoint, in the optical glass according to the present embodiment, the content amount of $B^{3+}$ is preferably reduced, and it is more preferable that $B^{3+}$ is substantially excluded.

In the present specification, "substantially excluded" means that the component is not contained as a constituent component that affects a property or a glass composition beyond a concentration in which the component is inevitably contained as an impurity. For example, when the content amount is approximately 100 ppm, the component is regarded as being substantially excluded.

$Al^{3+}$ is a component that increases devitrification resistance and causes low dispersion. When the content amount of $Al^{3+}$ is excessively small, low dispersibility is liable to be impaired. When the content amount of $Al^{3+}$ is excessively great, a $\Delta P_{g,F}$ value described later is liable to be reduced. From such a viewpoint, the content amount of $Al^{3+}$ is from 10% to 20%. Then, an upper limit thereof is preferably 18% and more preferably 16%. A lower limit thereof is preferably 12% and more preferably 14%.

$Ba^{2+}$ is a component that increases a refractive index while maintaining a $\Delta P_{g,F}$ value. When the content amount of $Ba^{2+}$ is excessively small, a refractive index is liable to be reduced. When the content amount of $Ba^{2+}$ is excessively great, devitrification resistance is liable to be degraded. From such a viewpoint, the content amount of $Ba^{2+}$ is from 20% to 40%. Then, an upper limit thereof is preferably 36% and more preferably 32%. A lower limit thereof is preferably 24% and more preferably 28%.

The optical glass according to the present embodiment may further contain each component below as necessary.

$Li^{+}$ is a component that increases a $\Delta P_{g,F}$ value and a refractive index, and also improves meltability of a glass. However, when the content amount of $Li^{+}$ is excessively great, devitrification resistance is liable to be degraded. From such a viewpoint, the content amount of Lit is preferably from 0% to 6%. Then, an upper limit thereof is more preferably 4% and further preferably 3%. A lower limit thereof is more preferably 1% and further preferably 2%.

$Na^{+}$ and $K^{+}$ may be used as a component capable of increasing meltability of a glass, but may greatly reduce a refractive index. From such a viewpoint, in the optical glass according to the present embodiment, it is preferable that $Na^{+}$ and $K^{+}$ are substantially excluded. As a matter or course, when meltability of a glass is desired to be particularly increased, $Na^{+}$ and $K^{+}$ may be contained.

$Mg^{2+}$ is a component that increases a refractive index while maintaining a $\Delta P_{g,F}$ value. However, when the content amount of $Mg^{2+}$ is excessively great, devitrification resistance is liable to be degraded. From such a viewpoint, the content amount of $Mg^{2+}$ is preferably from 0% to 15%. Then, an upper limit thereof is more preferably 12% and further preferably 8%. A lower limit thereof is more preferably 3% and further preferably 4%.

$Ca^{2+}$ is a component that increases a refractive index while maintaining a $\Delta P_{g,F}$ value. However, when the content amount of $Ca^{2+}$ is excessively great, devitrification resistance is liable to be degraded. From such a viewpoint, the content amount of $Ca^{2+}$ is preferably from 0% to 20%. Then, an upper limit thereof is more preferably 10% and further preferably 6%. A lower limit thereof is more preferably 2% and further preferably 3%.

$Sr^{2+}$ is a component that increases a refractive index while maintaining a $\Delta P_{g,F}$ value. However, when the content amount of $Sr^{2+}$ is excessively great, devitrification resistance is liable to be degraded. From such a viewpoint, the content amount of $Sr^{2+}$ is preferably from 0% to 20%. Then, an upper limit thereof is more preferably 10% and further preferably 6%. A lower limit thereof is more preferably 2% and further preferably 3%.

$Zn^{2+}$ is a component that increases a refractive index, and also increases meltability of a glass. However, when the content amount of $Zn^{2+}$ is excessively great, low dispersibility is liable to be impaired. From such a viewpoint, the content amount of $Zn^{2+}$ is preferably from 0% to 15%. Then, an upper limit thereof is more preferably 8% and further preferably 4%. A lower limit thereof is more preferably 1% and further preferably 2%.

$Y^{3+}$ is a component that increases a refractive index. However, when the content amount of $Y^{3+}$ is excessively great, devitrification resistance is liable to be degraded. From such a viewpoint, the content amount of $Y^{3+}$ is preferably from 0% to 6%. Then, an upper limit thereof is more preferably 4% and further preferably 2%. A lower limit thereof is more preferably 0.5% and further preferably 1%.

$La^{3+}$ is a component that increases a refractive index. However, when the content amount of $La^{3+}$ is excessively great, devitrification resistance is liable to be degraded. From such viewpoint, the content amount of $La^{3+}$ is preferably from 0% to 6%. Then, an upper limit thereof is more preferably 4% and further preferably 2%. A lower limit thereof is more preferably 0.5% and further preferably 1%.

$Gd^{3+}$ is a component that increases a refractive index. However, when the content amount of $Gd^{3+}$ is excessively great, devitrification resistance is liable to be degraded. From such a viewpoint, the content amount of $Gd^{3+}$ is preferably 0% to 6%. Then, an upper limit thereof is more preferably 4% and further preferably 2%. A lower limit thereof is more preferably 0.5% and further preferably 1%.

$Ti^{4+}$ is a component that increases a refractive index while maintaining a $\Delta P_{g,F}$ value. However, when the content amount of Tim is excessively great, low dispersibility is liable to be impaired. From such a viewpoint, the content amount of $Ti^{4+}$ is preferably from 0% to 6%. Then, an upper Limit thereof is more preferably 4.5% and further preferably 3%. A lower limit thereof is more preferably 0.5% and further preferably 1%.

$Zr^{4+}$ is a component that increases a refractive index while maintaining a $\Delta P_{g,F}$ value. However, when the content amount of $Zr^{4+}$ is excessively great, low dispersibility liable to be impaired. From such a viewpoint, the content amount of $Zr^{4+}$ is preferably from 0% to 3%. Then, an upper limit thereof is more preferably 2% and further preferably 1%. A lower limit of this content amount is more preferably 0.5%.

$Nb^{5+}$ is a component that increases a refractive index while maintaining a $\Delta P_{g,F}$ value. However, when the content amount of $Nb^{5+}$ is excessively great, low dispersibility is liable to be impaired. From such a viewpoint, the content amount of $Nb^{5+}$ is preferably from 0% to 8%. Then, an upper limit thereof is more preferably 6% and further preferably 4%. A lower limit thereof is more preferably 1% and further preferably 2%.

$Ta^{5+}$ is a component that increases a refractive index while maintaining a $\Delta P_{g,F}$ value. However, when the content amount of $Ta^{5+}$ is excessively great, low dispersibilty is liable to be impaired. From such a viewpoint, the content amount of $Ta^{5+}$ is preferably from 0% to 4%. Then, an upper limit thereof is more preferably 3% and further preferably 2%. A lower limit thereof is, more preferably 0.5% and further preferably 1%.

However, since $Ta^{5+}$ is an expensive raw material, the content amount thereof is desired to be reduced. Thus, when a cost reduction is prioritized, it is preferable that the optical glass according to the present embodiment does not substantially contain $Ta^{5+}$. In this way, the optical glass according to the present embodiment can exhibit excellent physical properties without containing $Ta^{5+}$ being an expensive raw material, and is thus excellent also in terms of a cost.

In addition, from a viewpoint of a cost, it is preferable that the optical glass according to the present embodiment does not substantially contain $Ge^{4+}$ and $Te^{4+}$.

$W^{6+}$ is a component that increases a refractive index while maintaining a $\Delta P_{g,F}$ value. However, when the content amount of $W^{6+}$ is excessively great, low dispersibility is liable to be impaired. From such a viewpoint, the content amount of $W^{6+}$ is preferably from 0% to 6%. Then, an upper limit thereof is more preferably 4% and further preferably 2%. A lower limit thereof is more preferably 0.5% and further preferably 1%.

$Sb^{3+}$ is a component that provides a defoaming effect. The content amount of $Sb^{3+}$ is preferably from 0% to 1%. An upper limit thereof is more preferably 0.5% and further preferably 0.2%. A lower limit of this content amount is more preferably 0.1%.

From a viewpoint of further improving physical properties of the optical glass according to the present embodiment, one or more kinds selected from a group formed of the $Li^{+}$ component, the $Mg^{2+}$ component, the $Ca^{2+}$ component, the $Sr^{2+}$ component, the $Zn^{2+}$ component, the $Y^{3+}$ component, the $La^{3+}$ component, the $Gd^{3+}$ component, the $Ti^{4+}$ component, the $Zr^{4+}$ component, the $Nb^{5+}$ component, the $Ta^{5+}$ component, and the $W^{6+}$ component are preferably included.

Then, suitable combinations of any components described above are the $Li^{+}$ component: 0% to 6%, the $Mg^{2+}$ component: 0% to 15%, the $Ca^{2+}$ component: 0% to 20%, the $Sr^{2+}$ component: 0% to 20%, the $Zn^{2+}$ component: 0% to 15%, the $Y^{3+}$ component: 0% to 6%, the $La^{3+}$ component: 0% to 6%, the $Gd^{3+}$ component: 0% to 6%, the $Ti^{4+}$ component: 0% to 6%, the $Zr^{4+}$ component: 0% to 3%, the $Nb^{5+}$ component: 0% to 8%, the $Ta^{5+}$ component: 0% to 4%, and the $W^{6+}$ component: 0% to 6%. Such a component is used in combination, and thus physical properties of an optical glass can be further improved.

Furthermore, it is preferable that the optical glass according to the present embodiment further satisfies the following conditions.

From a viewpoint of increasing devitrification resistance and setting a high refractive index, the $P^{5+}$ component+the $Al^{3+}$ component is preferably from 40% to 65%. Then, an upper limit thereof is more preferably 58% and further preferably 55%. A lower limit thereof more preferably 45% and further preferably 53%.

From a viewpoint of increasing devitrification resistance and setting a high refractive index, the $Mg^{2+}$ component+the $Ca^{2+}$ component+the $Sr^{2+}$ component+the $Ba^{2+}$ component+the $Zn^{2+}$ component ($\Sigma AE^{2+}$) is preferably from 35% to 50%. Then, an upper limit thereof is more preferably 44% and further preferably 41%. A lower limit thereof is more preferably 36% and further preferably 39%.

From a viewpoint of increasing devitrification resistance and setting a high refractive index, the $Y^{3+}$ component+the $La^{3+}$ component+the $Gd^{3+}$ component ($\Sigma RE^{3+}$) is preferably from 0% to 6%. Then, an upper limit thereof is more preferably 5% and further preferably 3%. A lower limit thereof is more preferably 0.5% and further preferably 1%.

From a viewpoint of increasing devitrification resistance and setting a high refractive index and a high $\Delta P_{g,F}$ value, the $Ti^{4+}$ component+the $Zr^{4+}$ component+the $Nb^{5+}$ component+the $Ta^{5+}$ component+the $W^{6+}$ component ($\Sigma TM^{n+}$) is preferably more than 0% to 10% or less. Then, an upper limit thereof is more preferably 5% or less and further preferably 4% or less. A lower limit thereof is more preferably 0.5% or more and further preferably 1% or more.

From a viewpoint of increasing devitrification resistance and setting a high abbe number and a high $\Delta P_{g,F}$ value, a proportion of the $P^{5+}$ component to the $Al^{3+}$ component ($P^{5+}/Al^{3+}$) is preferably from 1.5 to 4.5. Then, an upper limit thereof is more preferably 4 and further preferably 3. A lower limit thereof is more preferably 2 and further preferably 2.5.

From a viewpoint of increasing devitrification resistance and setting a high refractive index and a high $\Delta P_{g,F}$ value, a proportion of the $Ba^{2+}$ component+the $Zn^{2+}$ component to the $Mg^{2+}$ component+the $Ca^{2+}$ component+the $Sr^{2+}$ component ($(Ba^{2+}+Zn^{2+})/(Mg^{2+}+Ca^{2+}+Sr^{2+})$) is preferably from 0.5 to 10. Then, an upper limit thereof is more preferably 5 and further preferably 3. A lower limit thereof is more preferably 1 and further preferably 2.

From a viewpoint of acquiring a high refractive index and a high $\Delta P_{g,F}$ value while maintaining devitrification resistance, a proportion of the $Li^{+}$ component+the $Mg^{2+}$ component+the $Ca^{2+}$ component+the $Sr^{2+}$ component+the $Ba^{2+}$ component+the $Zn^{2+}$ component+the $Y^{3+}$ component+the $La^{3+}$ component+the $Gd^{3+}$ component+the $Ti^{4+}$ component+the $Zr^{4+}$ component+the $Nb^{5+}$ component+the $Ta^{5+}$ component+the $W^{6+}$ component$^{+}$ to the $P^{5+}$ component+the $Al^{3+}$ component ($(Li^{+}+\Sigma AE^{2+}+\Sigma RE^{3+}+\Sigma TM^{n+})/(P^{5+}+Al^{3+})$) is preferably from 0.7 to 1.3. Then, an upper limit thereof is more preferably 1.1 and further preferably 0.9. A lower limit thereof is more preferably 0.75 and further preferably 0.8.

From a viewpoint of setting a high refractive index and a high $\Delta P_{g,F}$ value, by atom % (at %), a proportion of the $Ti^{4+}$ component+the $Zr^{4+}$ component+the $Nb^{5+}$ component+the $Ta^{5+}$ component+the $W^{6+}$ component ($\Sigma TM^{n+}$) to the $F^{-}$ component ($(\Sigma TM^{n+})/F^{-}$) is preferably from 0.05 to 0.35. Then, an upper limit thereof is more preferably 0.2 and further preferably 0.12. A lower limit thereof is more preferably 0.06 and further preferably 0.08.

(Anion Component)

The content amount of $O^{-}$ is from 75% to 95%. Then, an upper limit thereof is preferably 90% and more preferably 86%. A lower limit thereof is preferably 82% and more preferably 84%.

$F^{-}$ is a component that increases a $\Delta P_{g,F}$ value and an abbe number. When the content amount of $F^{-}$ is excessively small, a $\Delta P_{g,F}$ value is liable to be reduced and low dispersibility is liable to be impaired. When the content amount of $F^{-}$ is excessively great, a refractive index is liable to be reduced. From such a viewpoint, the content amount of $F^{-}$ is from 5% to 25%. Then, an upper limit thereof is preferably 18% and more preferably 16%. A lower limit thereof is preferably 10% and more preferably 14%.

Note that the optical glass according to the present embodiment may contain an anion component other than the component described above. However, when the optical glass is used as a fluoride glass, the optical glass may contain only $O^{-}$ and $F^{-}$.

However, "containing only $O^{-}$ and $F^{-}$" herein means that an anion component other than $O^{-}$ and $F^{-}$ is not contained as a constituent component that affects a property of a glass composition beyond a concentration in which the component is inevitably contained as an impurity. For example, when an anion component other than $O^{-}$ and $F^{-}$ whose content amount is approximately 100 ppm is mixed, the anion component is regarded as being substantially excluded.

Furthermore, for the purpose of, for example, performing fine adjustments of fining, coloration, decoloration, and optical constant values, a known component such as a fining agent, a coloring agent, a defoaming agent, and an oxide may be added by an appropriate amount to the glass composition as needed. In addition to the above-mentioned components, other components may be added as long as the effect of the optical glass according to the present embodiment can be exerted.

Next, description is made on physical properties of the optical glass according to the present embodiment.

From a viewpoint of reduction in thickness of the lens, the optical glass according to the present embodiment preferably has a high refractive index (a refractive index ($n_d$) is large). However, since an abbe number ds generally liable to be reduced as a refractive index is higher, a refractive index ($n_d$)) of the optical glass according to the present embodiment preferably falls within a range from 1.60 to 1.70. Then, since a refractive index, an abbe number, and a $\Delta P_{g,F}$ value are liable to fall into a trade-off relationship, an upper limit of the refractive index is more preferably 1.67 and further preferably 1.64. A lower limit thereof is more preferably 1.61 and further preferably 1.62.

From a viewpoint of correction of lens aberration, the optical glass according to the resent embodiment is desired to have low dispersion (an abbe number ($\nu_d$) is large). However, since a refractive index is generally liable to be reduced as an abbe number is larger, an abbe number ($\nu_d$) of the optical glass according to the present embodiment preferably falls within a range from 40 to 65. Then, since a refractive index, an abbe number, and a $\Delta P_{g,F}$ value are liable to fall into a trade-off relationship, an upper limit of the abbe number is more preferably 63 and further preferably 61. A lower limit thereof is more preferably 50 and further preferably 58.

A partial dispersion ratio ($P_{g,F}$) of the optical glass according to the present embodiment is preferably from 0.550 to 0.570. Then, an upper limit thereof is more preferably 0.562 and further preferably 0.558. A lower limit thereof is more preferably 0.552 and further preferably 0.554.

A $\Delta P_{g,F}$ value of the optical glass according to the present embodiment is preferably from 0.005 to 0.015. Then, since a refractive index, an abbe number, and a $\Delta P_{g,F}$ value are liable to fall into a trade-off relationship, an upper limit of the abbe number is more preferably 0.013 and further preferably 0.011. A lower limit thereof is more preferably 0.007 and further preferably 0.009. The $\Delta P_{g,F}$ value is an index of abnormal dispersibility.

Specific gravity ($S_g$) of the optical glass according to the present embodiment is preferably from 3.90 to 4.20. An upper limit thereof is more preferably 4.15 and further preferably 4.10.

A lower limit thereof is more preferably 3.95 and further preferably 4.00.

A glass transition temperature (T) of the optical glass according to the present embodiment is preferably 650 degrees Celsius or lower. An upper limit thereof is more preferably 620 degrees Celsius and further preferably 600 degrees Celsius. By setting this glass transition temperature, excellent mold formability can be acquired.

A method of manufacturing the optical glass according to the present embodiment is not particularly limited, and a publicly known method may be adopted. Suitable conditions can be selected for the manufacturing conditions as appropriate. As one of the suitable examples, there is a method including a process of selecting, as a glass raw material, one kind selected from oxides, hydroxides, phosphate compounds (such as phosphates and orthophosphates), carbonates, sulfates, fluorides, nitrates, and the like corresponding to each of the components described above, mixing the glass raw material, melting the glass raw material at a temperature of 1,100 to 1,400 degrees Celsius, and stirring the glass raw material to be uniformed, and a process of then cooling and molding the glass raw material.

More specifically, there may be adopted a manufacturing method in which raw materials such as oxides, hydroxides, phosphate compounds (such as phosphates and or carbonates, sulfates, fluorides, and nitrates are blended to obtain a target composition, melted at a temperature of preferably from 1,100 to 1,400 degrees Celsius, more preferably from 1,100 to 1,300 degrees Celsius, further preferably 1,100 to 1,250 degrees Celsius, uniformed by stirring, subjected to defoaming, then poured in a mold, and molded. The optical glass thus obtained is processed to have a desired shape by performing re-heat pressing or the like as needed, and is subjected to polishing. With this, a desired optical glass and a desired optical element can be obtained.

As described above, the optical glass according to the present embodiment has a high refractive index, low dispersion, and high abnormal dispersibility, and the like, and is thus suitable as an optical element such as a lens included in an optical device such as a camera and a microscope. Such an optical element includes a mirror, a lens, a prism, a filter, and the like. Examples of an optical system including the optical element include, for example, an objective lens, a condensing lens, an image forming lens, an interchangeable camera lens, and the like, and the optical system can be more suitably used for an interchangeable camera lens and the like. The optical system can be used for an imaging device, such as a camera with an interchangeable lens and a camera with a non-interchangeable lens, and a microscope such as a multi-photon microscope. Note that, the optical device is not limited to the imaging device and the microscope described above, and also includes a video camera, a teleconverter, a telescope, a binocular, a monocular, a laser range finder, a projector, and the like. When the optical glass according to the present embodiment is used in such a use, a reduction in chromatic aberration and power as a convex lens can be achieved. An example thereof will be described below.

<Imaging Device>

FIG. 1 is a perspective view of an imaging device including an optical element using the optical glass according to the present embodiment.

An imaging device 1 is a so-called digital single-lens reflex camera (a lens-interchangeable camera), and a photographing lens 103 (an optical system) includes an optical element including, as a base material, the optical glass according to the present embodiment. A lens barrel 102 mounted to a lens mount (not illustrated) of a camera body 101 in a removable manner. An image is formed with light, which passes through the lens 103 of the lens barrel 102, on a sensor chip (solid-state imaging elements) 104 of a multi-chip module 106 arranged on a back surface side of the camera body 101. The sensor chip 104 is a so-called bare chip such as a CMOS image sensor, and the multi-chip module 106 is, for example, a Chip On Glass (COG) type module including the sensor chip 104 being a bare chip mounted on a glass substrate 105.

Figure 2:
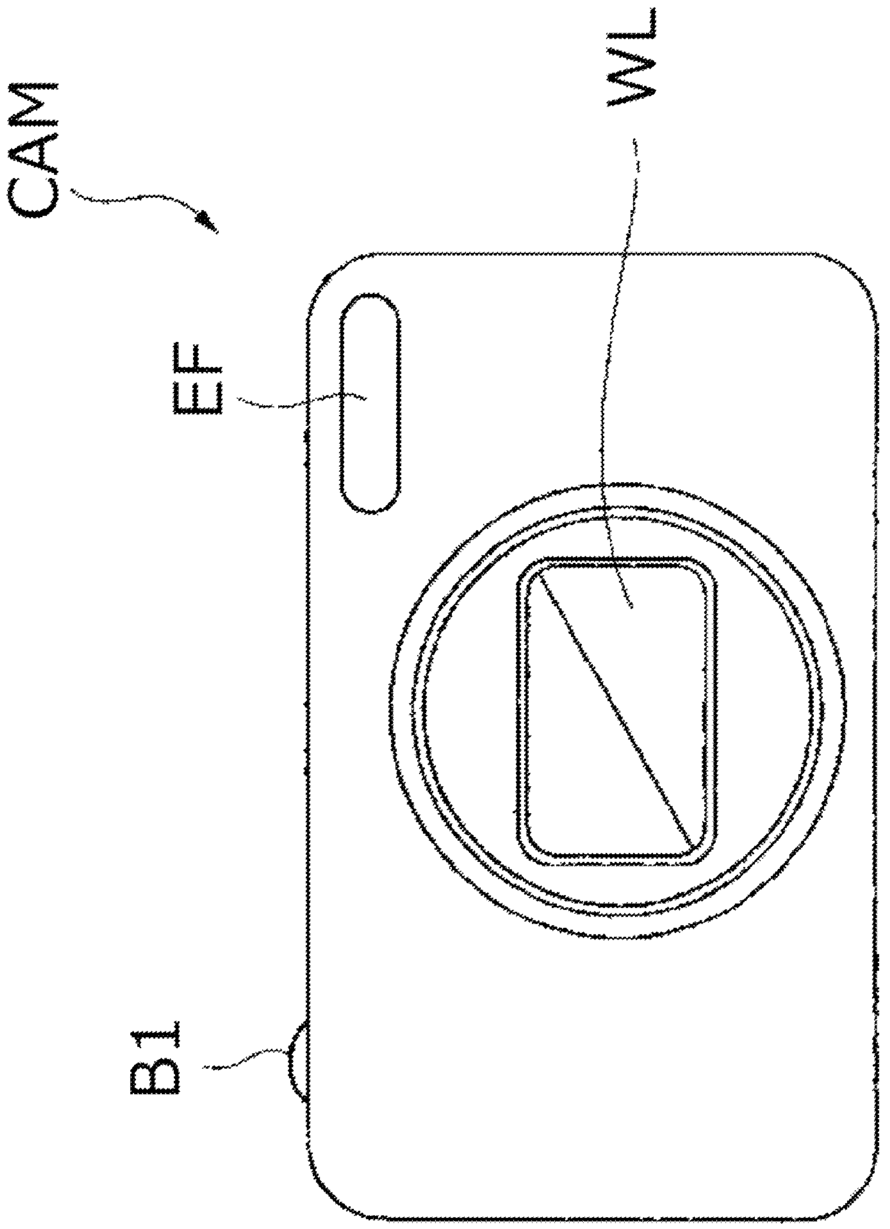
FIG. 2 is a front view of another example of the imaging device including the optical element using the optical glass according to the present embodiment.
Figure 3:
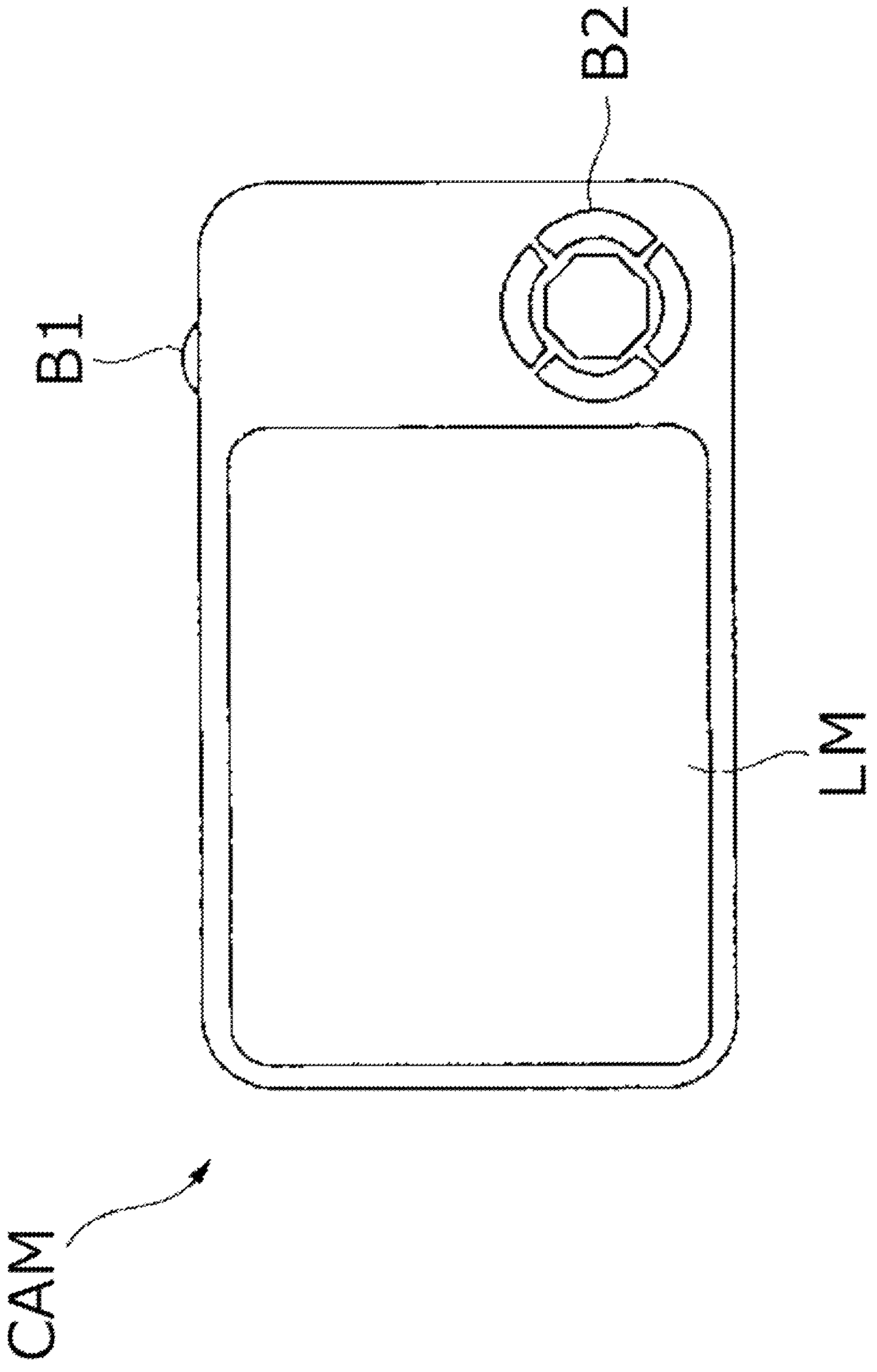
FIG. 3 is a rear view of the imaging device in FIG. 2.

FIG. 2 is a front view of another example of the imaging device including the optical element using the optical glass according to the present embodiment. FIG. 3 is a rear view of the imaging device in FIG. 2.

The imaging device CAM is a so-called digital still camera (a fixed lens camera), and a photographing lens ML (an optical system) includes an optical element including, as a base material, the optical glass according to the present embodiment.

When a power button (not illustrated) of the imaging device CAM is pressed, a shutter (not illustrated) of the photographing lens WL is opened, light from an object to be imaged (a body) is converged by the photographing lens ML and forms an image on imaging elements arranged on an image surface. An object image formed on the imaging elements is displayed on a liquid crystal monitor LM arranged on the back of the imaging device CAM. A photographer decides composition of the object image while viewing the liquid crystal monitor LM, then presses down a release button B1, and captures the object image on the imaging elements. The object image is recorded and stored in a memory (not illustrated).

An auxiliary light emitting unit EF that emits auxiliary light in a case that the object is dark and a function button E2 to be used for setting various conditions of the imaging device CAM and the like are arranged on the imaging device CAM.

A higher resolution, lighter weight, and a smaller size are demanded for the optical system to be used in such a digital camera or the like. In order to achieve such demands, it is effective to use glass with a high refractive index as the optical system. Particularly, glass that achieves both a high refractive index and lower specific gravity ($S_g$) and has high press formability is highly demanded. From such a viewpoint, the optical glass according to the present embodiment is suitable as a member of such optical equipment. Note that, in addition to the imaging device described above, examples of the optical equipment to which the present embodiment is applicable include a projector and the like. In addition to the lens, examples of the optical element include a prism and the like.

<Multi-Photon Microscope>

Figure 4:
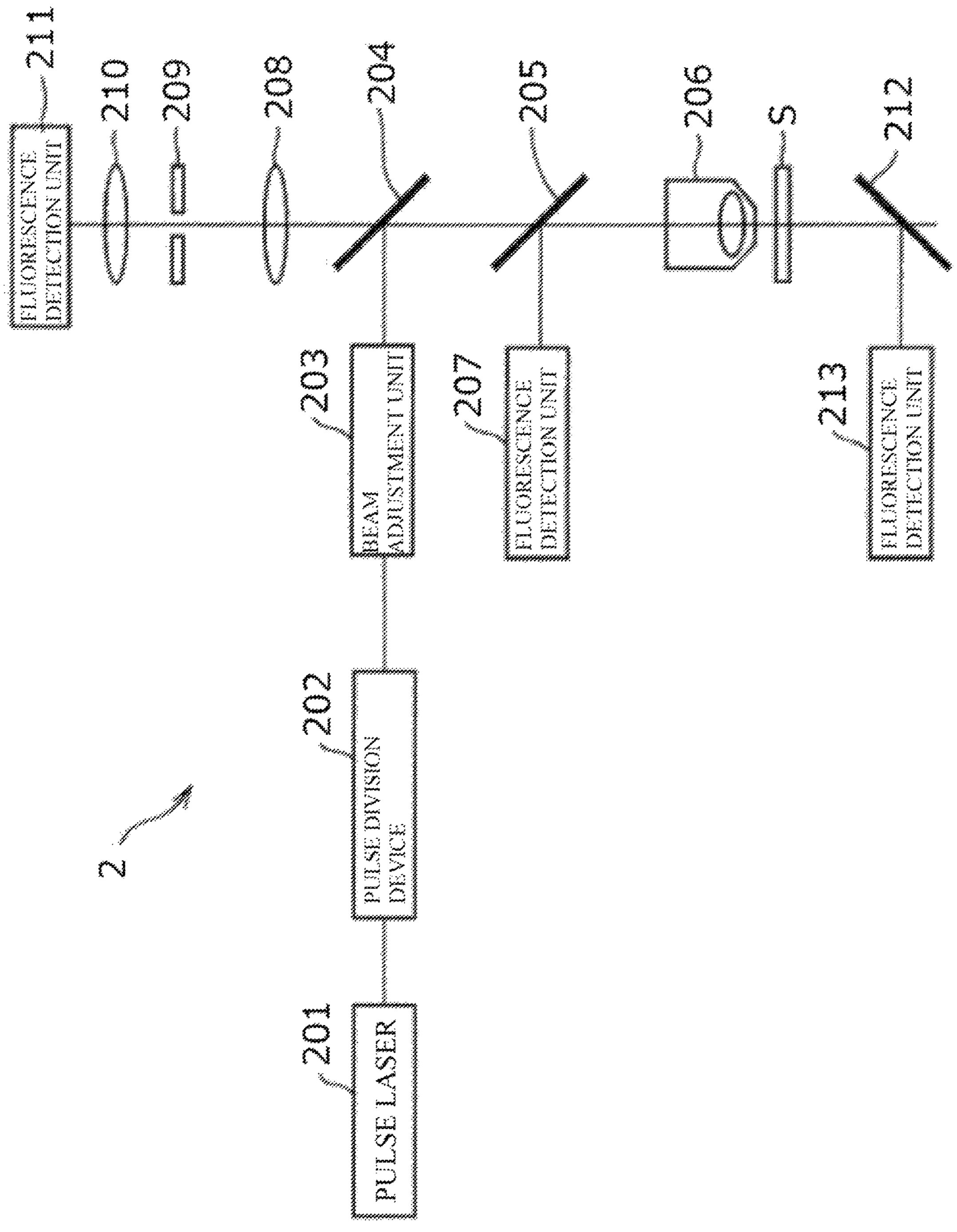
FIG. 4 is a block diagram illustrating an example of a configuration of a multi-photon microscope including the optical element using the optical glass according to the present embodiment.

FIG. 4 is a block diagram illustrating an example of a configuration of a multi-photon microscope 2 including the optical element using the optical glass according to the present embodiment.

The multi-photon microscope 2 includes an objective lens 206, a condensing lens 208, and an image forming lens 210. At least one of the objective lens 206, the condensing lens 208, and the image forming lens 210 includes an optical element including, as a base material, the optical glass according to the present embodiment. Hereinafter, description is mainly made on the optical system of the multi-photon microscope 2.

A pulse laser device 201 emits ultrashort pulse light having, for example, a near infrared wavelength (approximately 1,000 nm) and a pulse width of a femtosecond unit (for example, 100 femtoseconds) In general, ultrashort pulse light immediately after being emitted from the pulse laser device 201 is linearly polarized light that is polarized in a predetermined direction.

A pulse division device 202 divides the ultrashort pulse light, increases a repetition frequency of the ultrashort pulse light, and emits the ultrashort pulse light.

A beam adjustment unit 203 has a function of adjusting a beam diameter of the ultrashort pulse light, which enters from the pulse division device 202, to a pupil diameter of the objective lens 206, a function of adjusting convergence and divergence angles of the ultrashort pulse light in order to correct chromatic aberration (a focus difference) on an axis of a wavelength of multi-photon excitation light emitted from a sample S and the wavelength of the ultrashort pulse light, a pre-chirp function (group velocity dispersion compensation function) providing inverse group velocity dispersion to the ultrashort pulse light in order to correct the pulse width of the ultrashort pulse light, which is increased due to group velocity dispersion at the time of passing through the optical system, and the like.

The ultrashort pulse light emitted from the pulse laser device 201 has a repetition frequency increased by the pulse division device 202, and is subjected to the above-mentioned adjustments by the beam adjustment unit 203. Furthermore, the ultrashort pulse light emitted from the beam adjustment unit 203 is reflected on a dichroic mirror 204 in a direction toward a dichroic mirror 205, passes through the dichroic mirror 205, is converged by the objective lens 206, and is radiated to the sample S. At this time, an observation surface of the sample S may be scanned with the ultrashort pulse light through use of scanning means (not illustrated).

For example, when the sample S is subjected to fluorescence imaging, a fluorescent pigment by which the sample S is dyed is subjected to multi-photon excitation in an irradiated region with the ultrashort pulse light and the vicinity thereof on the sample 3, and fluorescence having a wavelength shorter than an infrared wavelength of the ultrashort pulse light (hereinafter, also referred to "observation light") is emitted.

The observation light emitted from the sample S in a direction toward the objective lens 206 is collimated by the objective lens 206, and is reflected on the dichroic mirror 205 or passes through the dichroic mirror 205 depending on the wavelength.

The observation light reflected on the dichroic mirror 205 enters a fluorescence detection unit 207. For example, the fluorescence detection unit 207 is formed of a barrier filter, a photo multiplier tube (PMT), or the like, receives the observation light reflected on the dichroic mirror 205, and outputs an electronic signal depending on an amount of the light. The fluorescence detection unit 207 detects the observation light over the observation surface of the sample S, in conformity with the ultrashort pulse light scanning on the observation surface of the sample S.

Meanwhile, the observation light passing through the dichroic mirror 205 is de-scanned by scanning means (not illustrated), passes through the dichroic mirror 204, is converged by the condensing lens 208, passes through a pinhole 209 provided at a position substantially conjugate to a focal position of the objective lens 206, passes through the image forming lens 210, and enters a fluorescence detection unit 211.

For example, the fluorescence detection unit 211 is formed of a barrier filter, a PMT, or the like, receives the observation light formed by the image forming lens 210 at the light reception surface of the fluorescence detection unit 211, and outputs an electronic signal depending on an amount of the light. The fluorescence detection unit 211 detects the observation light over the observation surface of the sample S, in conformity with the ultrashort pulse light scanning on the observation surface of the sample S.

Note that, all the observation light emitted from the sample S in a direction toward the objective lens 206 may be detected by the fluorescence detection unit 211 by excluding the dichroic mirror 205 from the optical path.

The observation light emitted from the sample S in a direction opposite to the objective lens 206 is reflected on a dichroic mirror 212, and enters a fluorescence detection unit 213. The fluorescence detection unit 213 is formed of, for example, a barrier filter, a PMT, or the like, receives the observation light reflected on the dichroic mirror 212, and outputs an electronic signal depending on an amount of the light. The fluorescence detection unit 213 detects the observation light over the observation surface of the sample S, in conformity with the ultrashort pulse light scanning on the observation surface of the sample S.

The electronic signals output from the fluorescence detection units 207, 211, and 213 are input to, for example, a computer (not illustrated). The computer is capable of generating an observation image, displaying the generated observation image, storing data on the observation image, based on the input electronic signals.

EXAMPLES

Next, Examples and Comparative Examples of the present invention will be described. The present invention is not limited to Examples. An optical glass was produced as follows, and physical properties thereof were evaluated.

<Production of Optical Glasses>

The optical glasses in Examples and Comparative Examples were produced by the following procedures. First, glass raw materials selected from oxides, hydroxides, phosphate compounds (phosphates, orthophosphoric acids, and the like), carbonates, sulphates, fluorides, nitrates, and the like were weighed so as to obtain the compositions illustrated in each table. Next, the weighed raw materials were mixed and put in a platinum crucible, melted for about 70 minutes at a temperature of from 1,100 to 1,300 degrees Celsius, and uniformed by stirring. After defoaming, the resultant was lowered to an appropriate temperature, poured in a mold, annealed, and molded. In this manner, each sample was obtained.

<Refractive Index ($n_d$) and Abbe Number ($\nu_d$)>

The refractive index of each of the samples was measured and calculated in conformity with JIS B 7071-1: 2015 "Measuring Method for Refractive Index. of Optical Glass". A refractive index ($n_d$) indicates a refractive index of the glass with respect to light of a d-line (wavelength of 587.562 nm). An abbe number ($\nu_d$) was obtained based on Expression (1) given below. $n_c$ and $n_F$ indicate refractive indexes of the glass with respect to a C-line (wavelength of 656.273 nm) and an (wavelength of 486.133 nm), respectively.

$$\nu_d=(n_d-1)/(n_F-n_c) \quad (1)$$

<Partial Dispersion Ratio ($P_{g,F}$)>

The partial dispersion ratio ($P_{g,F}$) in each of the samples indicates a ratio of partial dispersion ($n_g-n_F$) to main dispersion ($n_F-n_c$), and was obtained based on Expression (2) given below, $n_g$ indicates a refractive index of the glass with respect to a g-line (wavelength of 435.835 nm).

$$P_{g,F}=(n_g-n_F)/(n_F-n_c) \quad (2)$$

<Value Indicating Abnormal Dispersibility

The value ($\Delta P_{g,F}$) indicating abnormal dispersibility in each of the samples was obtained in conformity with a method indicated below.

Generation of Reference Line

First, as a normal partial dispersion glass, two glasses "F2" and "K7" having an abbe number ($\nu_d$) and a partial dispersion ratio ($P_{g,F}$) indicated below were used as reference materials. For each of the glasses, a horizontal axis indicates the abbe number ($\nu_d$), a vertical axis indicates the partial dispersion ratio ($P_{g,F}$), and a straight line connecting two points corresponding to the two reference materials is a reference line.

Property of glass "F2": $\nu_d$=36.33, $P_{g,F}$=0.5834

Property of glass "K7": $\nu_d$=60.47, $P_{g,F}$=0.5429

Reference line: $P_{g,F}$+0.00161783×$\nu_d$−0.64146248

(2) Calculation of $\Delta P_{g,F}$

Figure 5:
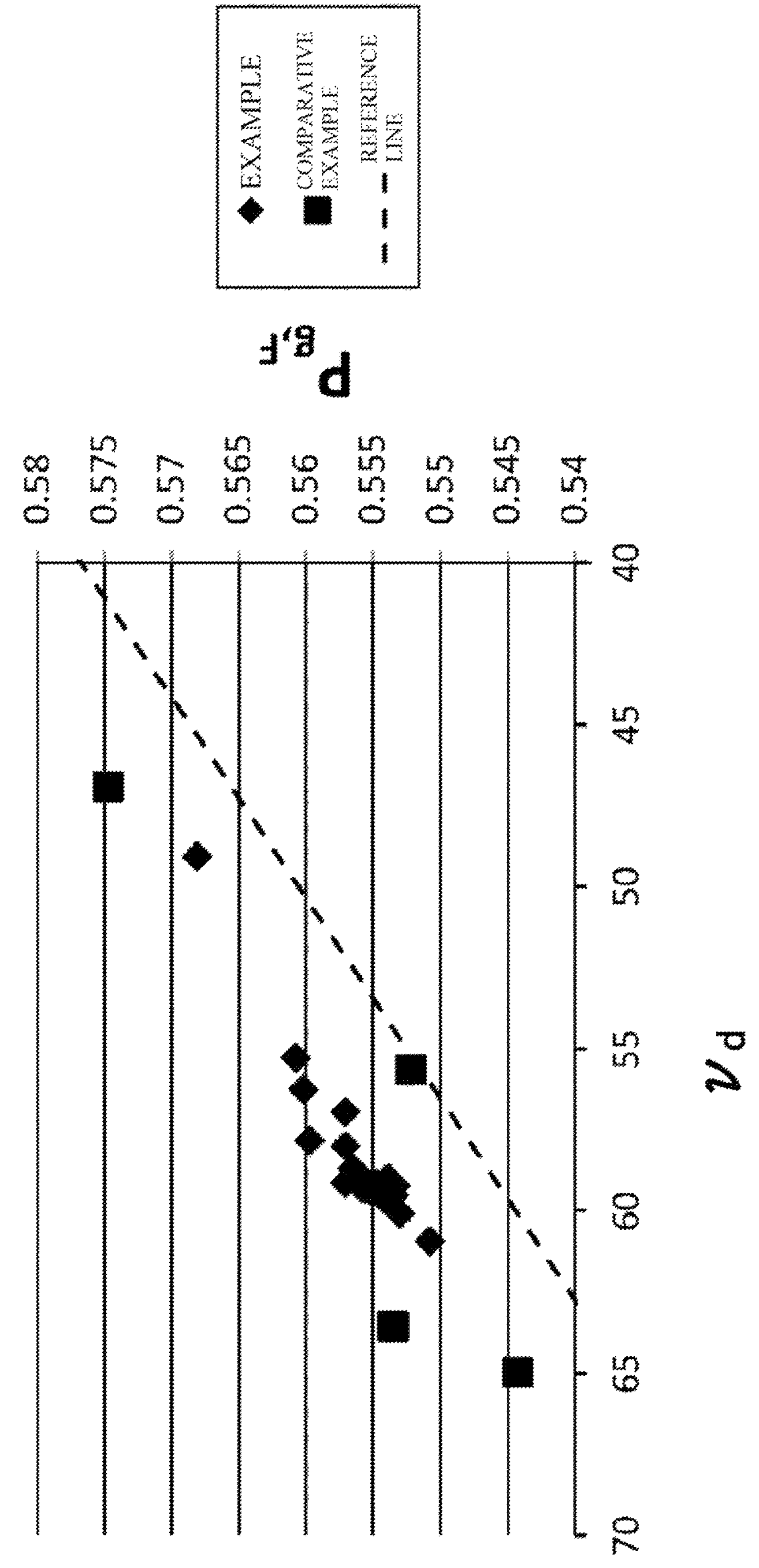
FIG. 5 is a graph in which an abbe number ($\nu_d$) and a partial dispersion ratio ($P_{g,F}$) of Example and Comparative Example are plotted.

Next, a value corresponding to each of the glasses was plotted on a graph whose horizontal axis indicates the abbe number ($\nu_d$) and vertical axis indicates the partial dispersion ratio ($P_{g,F}$, and a difference between a point on the reference line corresponding to the abbe number ($\nu_d$) of the glass type described above and the value ($P_{g,F}$) of the vertical axis was calculated as a value ($\Delta P_{g,F}$) indicating abnormal dipersibility. FIG. 5 illustrates a graph in which an abbe number ($\nu_d$) and a partial dispersion ratio ($P_{g,F}$) of Example and Comparative Example are plotted. Note that, when the partial dispersion ratio ($P_{g,F}$) was located on the upper side of the reference line, $\Delta P_{g,F}$ has a positive value, and when the partial dispersion ratio ($P_{g,F}$) is located on the lower side of the reference line, $\Delta P_{g,F}$ has a negative value.

<Specific Gravity ($S_g$)>

The specific gravity ($S_Q$) of each of the samples was obtained in conformity with JOGIS J05-1975 "Measuring Method for Specific Gravity of Optical Glass".

<Glass Transition Temperature ($T_g$)>

The glass transition temperature ($T_g$) of each of the samples was calculated from a DTA curve acquired from a measurement by a differential thermal analysis (a rate of temperature rise 10 degrees Celsius/min in the atmosphere with glass powder put in Pt cell).

<Devitrification Resistance Test>

Each of the samples was melted for 30 minutes at 1,050 to 1,100 degrees Celsius (without a lid), left as it is, and lowered to the glass transition temperature ($T_g$) or lower at 100 degrees Celsius/hour. The presence or absence of devitrifcation at this time was evaluated by a visual inspection based on the following reference.

A: There was only an extremely thin crystal layer on a surface, and no crystal deposition inside was seen.

B: Crystal deposition was confirmed in a part of a surface and an inside.

C: The entire sample was devitrified or an internal observation was difficult due to surface devitrification.

A composition and an evaluation result of Examples and Comparative Examples are shown in Tables 1 to 11. Note that, as described above, "$\Sigma TM^{n+}/F$" in Tables indicates a proportion of the $Ti^{4+}$ component+the $Zr^{4+}$ component+the $Nb^{5+}$ component+the $Ta^{5+}$ component+the $W^{6+}$ component ($\Sigma TM^{n+}$) to the $F^-$ component by atom % (at %).

TABLE 1

| | | EXAMPLE 1 | EXAMPLE 2 | EXAMPLE 3 | EXAMPLE 4 |
|---|---|---|---|---|---|
| ca % | $B^{3+}$ | 0.00 | 0.00 | 0.00 | 0.00 |
| | $P^{5+}$ | 39.56 | 39.56 | 39.34 | 39.58 |
| | $Al^{3+}$ | 14.32 | 14.32 | 15.83 | 15.32 |
| | $Li^+$ | 2.21 | 2.21 | 2.23 | 2.24 |
| | $Na^+$ | 0.00 | 0.00 | 0.00 | 0.00 |
| | K+ | 0.00 | 0.00 | 0.00 | 0.00 |
| | $Mg^{2+}$ | 6.62 | 6.39 | 3.40 | 3.42 |
| | $Ca^{2+}$ | 3.54 | 5.82 | 3.97 | 3.99 |
| | $Sr^{2+}$ | 0.00 | 0.00 | 0.00 | 0.00 |
| | $Ba^{2+}$ | 30.24 | 28.18 | 30.38 | 30.56 |
| | $Zn^{2+}$ | 0.00 | 0.00 | 1.33 | 1.34 |
| | $Y^{3+}$ | 0.00 | 0.00 | 0.00 | 0.00 |
| | $La^{3+}$ | 1.16 | 1.16 | 1.15 | 1.16 |

TABLE 1-continued

| | | EXAMPLE 1 | EXAMPLE 2 | EXAMPLE 3 | EXAMPLE 4 |
|---|---|---|---|---|---|
| | $Gd^{3+}$ | 0.00 | 0.00 | 0.00 | 0.00 |
| | $Ti^{4+}$ | 2.30 | 2.30 | 2.30 | 2.32 |
| | $Zr^{4+}$ | 0.00 | 0.00 | 0.00 | 0.00 |
| | $Nb^{5+}$ | 0.00 | 0.00 | 0.00 | 0.00 |
| | $Ta^{5+}$ | 0.00 | 0.00 | 0.00 | 0.00 |
| | $W^{6+}$ | 0.00 | 0.00 | 0.00 | 0.00 |
| | $Sb^{3+}$ | 0.06 | 0.06 | 0.07 | 0.06 |
| | ca % TOTAL | 100.00 | 100.00 | 100.00 | 100.00 |
| an % | $O^{2-}$ | 85.06 | 85.06 | 83.75 | 83.67 |
| | $F^-$ | 14.94 | 14.94 | 16.25 | 16.33 |
| | an % TOTAL | 100.00 | 100.00 | 100.00 | 100.00 |
| $P^{5+} + Al^{3+}$ | | 53.88 | 53.88 | 55.17 | 54.90 |
| $\Sigma AE^{2+}(=Mg^{2+} + Ca^{2+} + Sr^{2+} + Ba^{2+} + Zn^{2+})$ | | 40.39 | 40.39 | 39.08 | 39.31 |
| $\Sigma RE^{3+}(=Y^{3+} + La^{3+} + Gd^{3+})$ | | 1.16 | 1.16 | 1.15 | 1.16 |
| $\Sigma TM^{n+}(=Ti^{4+} + Zr^{4+} + Nb^{5+} + Ta^{5+} + W^{6+})$ | | 2.30 | 2.30 | 2.30 | 2.32 |
| $P^{5+}/Al^{3+}$ | | 2.76 | 2.76 | 2.49 | 2.58 |
| $(Ba^{2+} + Zn^{2+})/(Mg^{2+} + Ca^{2+} + Sr^{2+})$ | | 2.98 | 2.31 | 4.30 | 4.30 |
| $(Li^+ + \Sigma AE^{2+} + \Sigma RE^{3+} + \Sigma TM^{n+})/(P^{5+} + Al^{3+})$ | | 0.85 | 0.85 | 0.81 | 0.82 |
| $\Sigma TM^{n+}/F^-$ | | 0.085 | 0.085 | 0.077 | 0.077 |
| $n_d$ | | 1.627496 | 1.626256 | 1.627068 | 1.626093 |
| $\nu_d$ | | 59.24 | 59.26 | 59.31 | 59.09 |
| $P_{g,F}$ | | 0.5557 | 0.5552 | 0.5554 | 0.5559 |
| $\Delta P_{g,F}$ | | 0.0101 | 0.0096 | 0.0099 | 0.0100 |
| SPECIFIC GRAVITY | | 4.06 | 4.00 | 4.07 | 4.08 |
| $T_g$ (° C.) | | 580 | 575 | 565 | 567 |
| DEVITRIFICATION RESISTANCE | | A | A | A | A |

TABLE 2

| | | EXAMPLE 5 | EXAMPLE 6 | EXAMPLE 7 | EXAMPLE 8 |
|---|---|---|---|---|---|
| ca % | $B^{3+}$ | 0.00 | 0.00 | 0.00 | 0.00 |
| | $P^{5+}$ | 39.29 | 39.30 | 39.20 | 39.19 |
| | $Al^{3+}$ | 15.20 | 15.20 | 14.63 | 14.64 |
| | $Li^+$ | 2.23 | 2.23 | 2.21 | 2.21 |
| | $Na^+$ | 0.00 | 0.00 | 0.00 | 0.00 |
| | K+ | 0.00 | 0.00 | 0.00 | 0.00 |
| | $Mg^{2+}$ | 4.13 | 4.13 | 4.88 | 4.57 |
| | $Ca^{2+}$ | 3.96 | 3.97 | 3.96 | 5.18 |
| | $Sr^{2+}$ | 0.00 | 0.00 | 0.00 | 0.00 |
| | $Ba^{2+}$ | 30.33 | 30.33 | 31.03 | 30.11 |
| | $Zn^{2+}$ | 1.33 | 1.33 | 0.57 | 0.57 |
| | $Y^{3+}$ | 0.00 | 0.00 | 0.00 | 0.00 |
| | $La^{3+}$ | 1.15 | 1.15 | 1.15 | 1.16 |
| | $Gd^{3+}$ | 0.00 | 0.00 | 0.00 | 0.00 |
| | $Ti^{4+}$ | 2.30 | 2.30 | 2.30 | 2.30 |
| | $Zr^{4+}$ | 0.00 | 0.00 | 0.00 | 0.00 |
| | $Nb^{5+}$ | 0.00 | 0.00 | 0.00 | 0.00 |
| | $Ta^{5+}$ | 0.00 | 0.00 | 0.00 | 0.00 |
| | $W^{6+}$ | 0.00 | 0.00 | 0.00 | 0.00 |
| | $Sb^{3+}$ | 0.07 | 0.07 | 0.07 | 0.07 |
| | ca % TOTAL | 100.00 | 100.00 | 100.00 | 100.00 |
| an % | $O^{2-}$ | 83.74 | 83.75 | 83.75 | 83.74 |
| | $F^-$ | 16.26 | 16.25 | 16.25 | 16.26 |
| | an % TOTAL | 100.00 | 100.00 | 100.00 | 100.00 |
| $P^{5+} + Al^{3+}$ | | 54.49 | 54.50 | 53.84 | 53.83 |
| $\Sigma AE^{2+}(=Mg^{2+} + Ca^{2+} + Sr^{2+} + Ba^{2+} + Zn^{2+})$ | | 39.76 | 39.76 | 40.43 | 40.44 |
| $\Sigma RE^{3+}(=Y^{3+} + La^{3+} + Gd^{3+})$ | | 1.15 | 1.15 | 1.15 | 1.16 |
| $\Sigma TM^{n+}(=Ti^{4+} + Zr^{4+} + Nb^{5+} + Ta^{5+} + W^{6+})$ | | 2.30 | 2.30 | 2.30 | 2.30 |
| $P^{5+}/Al^{3+}$ | | 2.58 | 2.58 | 2.68 | 2.68 |
| $(Ba^{2+} + Zn^{2+})/(Mg^{2+} + Ca^{2+} + Sr^{2+})$ | | 3.91 | 3.91 | 3.58 | 3.15 |
| $(Li^+ + \Sigma AE^{2+} + \Sigma RE^{3+} + \Sigma TM^{n+})/(P^{5+} + Al^{3+})$ | | 0.83 | 0.83 | 0.86 | 0.86 |
| $\Sigma TM^{n+}/F^-$ | | 0.077 | 0.077 | 0.077 | 0.077 |
| $n_d$ | | 1.626737 | 1.626966 | 1.627173 | 1.626447 |
| $\nu_d$ | | 59.25 | 59.23 | 59.30 | 59.34 |
| $P_{g,F}$ | | 0.5558 | 0.5552 | 0.5554 | 0.5552 |
| $\Delta P_{g,F}$ | | 0.0102 | 0.0096 | 0.0099 | 0.0097 |
| SPECIFIC GRAVITY | | 4.08 | 4.09 | 4.08 | 4.06 |
| $T_g$ (° C.) | | 570 | 570 | 570 | 572 |
| DEVITRIFICATION RESISTANCE | | A | A | A | A |

TABLE 3

| | | EXAMPLE 9 | EXAMPLE 10 | EXAMPLE 11 | EXAMPLE 12 |
|---|---|---|---|---|---|
| ca % | $B^{3+}$ | 0.00 | 0.00 | 0.00 | 0.00 |
| | $P^{5+}$ | 39.32 | 38.31 | 38.02 | 39.03 |
| | $Al^{3+}$ | 14.38 | 17.28 | 17.15 | 15.71 |
| | $Li^{+}$ | 2.22 | 0.00 | 0.00 | 0.00 |
| | $Na^{+}$ | 0.00 | 0.00 | 0.00 | 0.00 |
| | K+ | 0.00 | 0.00 | 0.00 | 0.00 |
| | $Mg^{2+}$ | 4.35 | 3.44 | 3.41 | 5.58 |
| | $Ca^{2+}$ | 5.84 | 1.76 | 1.74 | 1.72 |
| | $Sr^{2+}$ | 0.00 | 0.00 | 0.00 | 0.00 |
| | $Ba^{2+}$ | 30.36 | 30.76 | 30.53 | 30.15 |
| | $Zn^{2+}$ | 0.00 | 4.73 | 4.70 | 4.64 |
| | $Y^{3+}$ | 0.00 | 0.00 | 0.75 | 0.00 |
| | $La^{3+}$ | 1.16 | 1.16 | 1.16 | 0.95 |
| | $Gd^{3+}$ | 0.00 | 0.00 | 0.00 | 0.00 |
| | $Ti^{4+}$ | 2.31 | 2.19 | 2.17 | 2.14 |
| | $Zr^{4+}$ | 0.00 | 0.00 | 0.00 | 0.00 |
| | $Nb^{5+}$ | 0.00 | 0.30 | 0.30 | 0.00 |
| | $Ta^{5+}$ | 0.00 | 0.00 | 0.00 | 0.00 |
| | $W^{6+}$ | 0.00 | 0.00 | 0.00 | 0.00 |
| | $Sb^{3+}$ | 0.07 | 0.08 | 0.07 | 0.07 |
| | ca % TOTAL | 100.00 | 100.00 | 100.00 | 100.00 |
| an % | $O^{2-}$ | 83.71 | 83.25 | 82.98 | 83.89 |
| | $F^{-}$ | 16.29 | 16.75 | 17.02 | 16.11 |
| | an % TOTAL | 100.00 | 100.00 | 100.00 | 100.00 |
| $P^{5+} + Al^{3+}$ | | 53.70 | 55.58 | 55.17 | 54.73 |
| $\Sigma AE^{2+}(=Mg^{2+} + Ca^{2+} + Sr^{2+} + Ba^{2+} + Zn^{2+})$ | | 40.55 | 40.69 | 40.39 | 42.10 |
| $\Sigma RE^{3+}(=Y^{3+} + La^{3+} + Gd^{3+})$ | | 1.16 | 1.16 | 1.90 | 0.95 |
| $\Sigma TM^{n+}(=Ti^{4+} + Zr^{4+} + Nb^{5+} + Ta^{5+} + W^{6+})$ | | 2.31 | 2.49 | 2.47 | 2.14 |
| $P^{5+}/Al^{3+}$ | | 2.74 | 2.22 | 2.22 | 2.48 |
| $(Ba^{2+} + Zn^{2+})/(Mg^{2+} + Ca^{2+} + Sr^{2+})$ | | 2.98 | 6.83 | 6.83 | 4.76 |
| $(Li^{+} + \Sigma AE^{2+} + \Sigma RE^{3+} + \Sigma TM^{n+})/(P^{5+} + Al^{3+})$ | | 0.86 | 0.80 | 0.81 | 0.83 |
| $\Sigma TM^{n+}/F^{-}$ | | 0.077 | 0.080 | 0.078 | 0.072 |
| $n_d$ | | 1.626351 | 1.628929 | 1.629683 | 1.627129 |
| $v_d$ | | 59.31 | 59.09 | 59.10 | 59.60 |
| $P_{g,F}$ | | 0.5555 | 0.5540 | 0.5539 | 0.5536 |
| $\Delta P_{g,F}$ | | 0.0100 | 0.0081 | 0.0080 | 0.0085 |
| SPECIFIC GRAVITY | | 4.05 | 4.15 | 4.15 | 4.11 |
| $T_g$ (° C.) | | 572 | 598 | 597 | 596 |
| DEVITRIFICATION RESISTANCE | | A | A | A | A |

TABLE 4

| | | EXAMPLE 13 | EXAMPLE 14 | EXAMPLE 15 | EXAMPLE 16 |
|---|---|---|---|---|---|
| ca % | $B^{3+}$ | 0.00 | 0.00 | 0.00 | 0.00 |
| | $P^{5+}$ | 37.53 | 39.83 | 39.83 | 39.83 |
| | $Al^{3+}$ | 16.93 | 16.04 | 16.03 | 16.04 |
| | $Li^{+}$ | 0.00 | 0.00 | 0.00 | 0.00 |
| | $Na^{+}$ | 0.00 | 0.00 | 0.00 | 0.00 |
| | K+ | 0.00 | 0.00 | 0.00 | 0.00 |
| | $Mg^{2+}$ | 5.58 | 3.44 | 3.44 | 3.44 |
| | $Ca^{2+}$ | 1.73 | 1.76 | 1.76 | 1.76 |
| | $Sr^{2+}$ | 0.00 | 0.00 | 0.00 | 0.00 |
| | $Ba^{2+}$ | 30.14 | 30.77 | 30.03 | 30.77 |
| | $Zn^{2+}$ | 4.64 | 4.74 | 4.73 | 4.74 |
| | $Y^{3+}$ | 0.00 | 0.00 | 0.75 | 0.00 |
| | $La^{3+}$ | 0.95 | 1.17 | 1.16 | 1.17 |
| | $Gd^{3+}$ | 0.00 | 0.00 | 0.00 | 0.00 |
| | $Ti^{4+}$ | 2.14 | 2.19 | 2.19 | 2.19 |
| | $Zr^{4+}$ | 0.00 | 0.00 | 0.00 | 0.00 |
| | $Nb^{5+}$ | 0.29 | 0.00 | 0.00 | 0.00 |
| | $Ta^{5+}$ | 0.00 | 0.00 | 0.00 | 0.00 |
| | $W^{6+}$ | 0.00 | 0.00 | 0.00 | 0.00 |
| | $Sb^{3+}$ | 0.07 | 0.07 | 0.07 | 0.07 |
| | ca % TOTAL | 100.00 | 100.00 | 100.00 | 100.00 |
| an % | $O^{2-}$ | 83.43 | 83.72 | 83.38 | 83.72 |
| | $F^{-}$ | 16.57 | 16.28 | 16.62 | 16.28 |
| | an % TOTAL | 100.00 | 100.00 | 100.00 | 100.00 |
| $P^{5+} + Al^{3+}$ | | 54.46 | 55.87 | 55.87 | 55.87 |
| $\Sigma AE^{2+}(=Mg^{2+} + Ca^{2+} + Sr^{2+} + Ba^{2+} + Zn^{2+})$ | | 42.08 | 40.71 | 39.96 | 40.71 |
| $\Sigma RE^{3+}(=Y^{3+} + La^{3+} + Gd^{3+})$ | | 0.95 | 1.17 | 1.92 | 1.17 |

TABLE 4-continued

| | EXAMPLE 13 | EXAMPLE 14 | EXAMPLE 15 | EXAMPLE 16 |
|---|---|---|---|---|
| $\Sigma\ TM^{n+}(=Ti^{4+} + Zr^{4+} + Nb^{5+} + Ta^{5+} + W^{6+})$ | 2.43 | 2.19 | 2.19 | 2.19 |
| $P^{5+}/Al^{3+}$ | 2.22 | 2.48 | 2.48 | 2.48 |
| $(Ba^{2+} + Zn^{2+})/(Mg^{2+} + Ca^{2+} + Sr^{2+})$ | 4.76 | 6.83 | 6.68 | 6.83 |
| $(Li^{+} + \Sigma\ AE^{2+} + \Sigma\ RE^{3+} + \Sigma\ TM^{n+})/(P^{5+} + Al^{3+})$ | 0.83 | 0.79 | 0.79 | 0.79 |
| $\Sigma\ TM^{n+}/F^{-}$ | 0.080 | 0.072 | 0.071 | 0.072 |
| $n_d$ | 1.629105 | 1.627971 | 1.627798 | 1.627304 |
| $v_d$ | 59.02 | 59.17 | 59.20 | 59.20 |
| $P_{g,F}$ | 0.5538 | 0.5547 | 0.5545 | 0.5541 |
| $\Delta P_{g,F}$ | 0.0078 | 0.0090 | 0.0088 | 0.0084 |
| SPECIFIC GRAVITY | 4.11 | 4.13 | 4.12 | 4.12 |
| $T_g$ (° C.) | 596 | 590 | 590 | 594 |
| DEVITRIFICATION RESISTANCE | A | A | A | A |

TABLE 5

| | | EXAMPLE 17 | EXAMPLE 18 | EXAMPLE 19 | EXAMPLE 20 |
|---|---|---|---|---|---|
| ca % | $B^{3+}$ | 0.00 | 0.00 | 0.00 | 0.00 |
| | $P^{5+}$ | 39.34 | 39.77 | 41.73 | 38.96 |
| | $Al^{3+}$ | 15.83 | 16.01 | 12.06 | 15.68 |
| | $Li^{+}$ | 2.23 | 0.00 | 0.00 | 0.00 |
| | $Na^{+}$ | 0.00 | 0.00 | 0.00 | 0.00 |
| | K+ | 0.00 | 0.00 | 0.00 | 0.00 |
| | $Mg^{2+}$ | 3.40 | 3.44 | 3.60 | 5.57 |
| | $Ca^{2+}$ | 3.97 | 4.01 | 1.84 | 1.72 |
| | $Sr^{2+}$ | 0.00 | 0.00 | 0.00 | 0.00 |
| | $Ba^{2+}$ | 29.27 | 30.73 | 32.22 | 30.10 |
| | $Zn^{2+}$ | 2.45 | 2.48 | 4.96 | 4.63 |
| | $Y^{3+}$ | 0.00 | 0.00 | 0.00 | 0.00 |
| | $La^{3+}$ | 1.15 | 1.16 | 1.22 | 1.14 |
| | $Gd^{3+}$ | 0.00 | 0.00 | 0.00 | 0.00 |
| | $Ti^{4+}$ | 2.30 | 2.33 | 2.29 | 2.14 |
| | $Zr^{4+}$ | 0.00 | 0.00 | 0.00 | 0.00 |
| | $Nb^{5+}$ | 0.00 | 0.00 | 0.00 | 0.00 |
| | $Ta^{5+}$ | 0.00 | 0.00 | 0.00 | 0.00 |
| | $W^{6+}$ | 0.00 | 0.00 | 0.00 | 0.00 |
| | $Sb^{3+}$ | 0.06 | 0.07 | 0.07 | 0.06 |
| | ca % TOTAL | 100.00 | 100.00 | 100.00 | 100.00 |
| an % | $O^{2-}$ | 83.75 | 83.75 | 83.11 | 83.92 |
| | $F^{-}$ | 16.25 | 16.25 | 16.89 | 16.08 |
| | an % TOTAL | 100.00 | 100.00 | 100.00 | 100.00 |
| $P^{5+} + Al^{3+}$ | | 55.17 | 55.78 | 53.80 | 54.64 |
| $\Sigma\ AE^{2+}(=Mg^{2+} + Ca^{2+} + Sr^{2+} + Ba^{2+} + Zn^{2+})$ | | 39.08 | 40.65 | 42.62 | 42.02 |
| $\Sigma\ RE^{3+}(=Y^{3+} + La^{3+} + Gd^{3+})$ | | 1.15 | 1.16 | 1.22 | 1.14 |
| $\Sigma\ TM^{n+}(=Ti^{4+} + Zr^{4+} + Nb^{5+} + Ta^{5+} + W^{6+})$ | | 2.30 | 2.33 | 2.29 | 2.14 |
| $P^{5+}/Al^{3+}$ | | 2.49 | 2.48 | 3.46 | 2.48 |
| $(Ba^{2+} + Zn^{2+})/(Mg^{2+} + Ca^{2+} + Sr^{2+})$ | | 4.30 | 4.46 | 6.83 | 4.76 |
| $(Li^{+} + \Sigma\ AE^{2+} + \Sigma\ RE^{3+} + \Sigma\ TM^{n+})/(P^{5+} + Al^{3+})$ | | 0.81 | 0.79 | 0.86 | 0.83 |
| $\Sigma\ TM^{n+}/F^{-}$ | | 0.077 | 0.077 | 0.072 | 0.072 |
| $n_d$ | | 1.627058 | 1.626211 | 1.626673 | 1.627786 |
| $v_d$ | | 59.14 | 59.15 | 57.81 | 59.56 |
| $P_{g,F}$ | | 0.5555 | 0.5554 | 0.5597 | 0.5535 |
| $\Delta P_{g,F}$ | | 0.0097 | 0.0096 | 0.0118 | 0.0084 |
| SPECIFIC GRAVITY | | 4.06 | 4.08 | 4.12 | 4.11 |
| $T_g$ (° C.) | | 568 | 596 | 569 | 595 |
| DEVITRIFICATION RESISTANCE | | A | A | B | A |

TABLE 6

| | | EXAMPLE 21 | EXAMPLE 22 | EXAMPLE 23 | EXAMPLE 24 |
|---|---|---|---|---|---|
| ca % | $B^{3+}$ | 0.00 | 0.00 | 0.00 | 0.00 |
| | $P^{5+}$ | 38.96 | 38.96 | 38.96 | 38.39 |
| | $Al^{3+}$ | 15.68 | 15.68 | 15.68 | 15.45 |
| | $Li^{+}$ | 0.00 | 0.00 | 0.00 | 3.62 |
| | $Na^{+}$ | 0.00 | 0.00 | 0.00 | 0.00 |
| | K+ | 0.00 | 0.00 | 0.00 | 0.00 |
| | $Mg^{2+}$ | 3.37 | 3.37 | 3.37 | 3.32 |
| | $Ca^{2+}$ | 3.93 | 1.72 | 1.72 | 1.70 |
| | $Sr^{2+}$ | 0.00 | 0.00 | 0.00 | 0.00 |
| | $Ba^{2+}$ | 30.10 | 32.30 | 30.10 | 29.66 |

TABLE 6-continued

| | | EXAMPLE 21 | EXAMPLE 22 | EXAMPLE 23 | EXAMPLE 24 |
|---|---|---|---|---|---|
| | $Zn^{2+}$ | 4.63 | 4.63 | 6.84 | 4.56 |
| | $Y^{3+}$ | 0.00 | 0.00 | 0.00 | 0.00 |
| | $La^{3+}$ | 1.14 | 1.14 | 1.14 | 1.12 |
| | $Gd^{3+}$ | 0.00 | 0.00 | 0.00 | 0.00 |
| | $Ti^{4+}$ | 2.14 | 2.14 | 2.14 | 2.11 |
| | $Zr^{4+}$ | 0.00 | 0.00 | 0.00 | 0.00 |
| | $Nb^{5+}$ | 0.00 | 0.00 | 0.00 | 0.00 |
| | $Ta^{5+}$ | 0.00 | 0.00 | 0.00 | 0.00 |
| | $W^{6+}$ | 0.00 | 0.00 | 0.00 | 0.00 |
| | $Sb^{3+}$ | 0.06 | 0.06 | 0.06 | 0.06 |
| | ca % TOTAL | 100.00 | 100.00 | 100.00 | 100.00 |
| an % | $O^{2-}$ | 83.92 | 83.92 | 83.92 | 82.06 |
| | $F^-$ | 16.08 | 16.08 | 16.08 | 17.94 |
| | an % TOTAL | 100.00 | 100.00 | 100.00 | 100.00 |
| $P^{5+} + Al^{3+}$ | | 54.64 | 54.64 | 54.64 | 53.84 |
| $\Sigma AE^{2+}(=Mg^{2+} + Ca^{2+} + Sr^{2+} + Ba^{2+} + Zn^{2+})$ | | 42.02 | 42.02 | 42.02 | 39.24 |
| $\Sigma RE^{3+}(=Y^{3+} + La^{3+} + Gd^{3+})$ | | 1.14 | 1.14 | 1.14 | 1.12 |
| $\Sigma TM^{n+}(=Ti^{4+} + Zr^{4+} + Nb^{5+} + Ta^{5+} + W^{6+})$ | | 2.14 | 2.14 | 2.14 | 2.11 |
| $P^{5+}/Al^{3+}$ | | 2.48 | 2.48 | 2.48 | 2.48 |
| $(Ba^{2+} + Zn^{2+})/(Mg^{2+} + Ca^{2+} + Sr^{2+})$ | | 4.76 | 7.26 | 7.26 | 6.83 |
| $(Li^+ + \Sigma AE^{2+} + \Sigma RE^{3+} + \Sigma TM^{n+})/(P^{5+} + Al^{3+})$ | | 0.83 | 0.83 | 0.83 | 0.86 |
| $\Sigma TM^{n+}/F^-$ | | 0.072 | 0.072 | 0.072 | 0.072 |
| $n_d$ | | 1.629277 | 1.630009 | 1.630122 | 1.626354 |
| $v_d$ | | 59.47 | 59.36 | 59.22 | 59.61 |
| $P_{g,F}$ | | 0.5535 | 0.5538 | 0.5534 | 0.5542 |
| $\Delta P_{g,F}$ | | 0.0083 | 0.0084 | 0.0077 | 0.0092 |
| SPECIFIC GRAVITY | | 4.11 | 4.17 | 4.15 | 4.12 |
| $T_g$ (° C.) | | 595 | 596 | 594 | 558 |
| DEVITRIFICATION RESISTANCE | | B | B | B | B |

TABLE 7

| | | EXAMPLE 25 | EXAMPLE 26 | EXAMPLE 27 | EXAMPLE 28 |
|---|---|---|---|---|---|
| ca % | $B^{3+}$ | 0.00 | 0.00 | 0.00 | 0.00 |
| | $P^{5+}$ | 39.69 | 39.84 | 39.64 | 39.83 |
| | $Al^{3+}$ | 15.97 | 16.03 | 13.41 | 16.03 |
| | $Li^+$ | 0.00 | 0.00 | 0.00 | 0.00 |
| | $Na^+$ | 0.00 | 0.00 | 0.00 | 0.00 |
| | K+ | 0.00 | 0.00 | 0.00 | 0.00 |
| | $Mg^{2+}$ | 3.43 | 3.44 | 2.85 | 0.00 |
| | $Ca^{2+}$ | 1.75 | 1.76 | 3.46 | 5.20 |
| | $Sr^{2+}$ | 0.00 | 0.00 | 0.00 | 0.00 |
| | $Ba^{2+}$ | 30.66 | 30.78 | 29.49 | 31.53 |
| | $Zn^{2+}$ | 4.72 | 4.74 | 6.96 | 4.74 |
| | $Y^{3+}$ | 0.00 | 0.00 | 0.00 | 0.00 |
| | $La^{3+}$ | 1.54 | 1.16 | 1.16 | 0.41 |
| | $Gd^{3+}$ | 0.00 | 0.00 | 0.00 | 0.00 |
| | $Ti^{4+}$ | 2.18 | 2.19 | 1.41 | 2.19 |
| | $Zr^{4+}$ | 0.00 | 0.00 | 0.00 | 0.00 |
| | $Nb^{5+}$ | 0.00 | 0.00 | 1.54 | 0.00 |
| | $Ta^{5+}$ | 0.00 | 0.00 | 0.00 | 0.00 |
| | $W^{6+}$ | 0.00 | 0.00 | 0.00 | 0.00 |
| | $Sb^{3+}$ | 0.07 | 0.07 | 0.07 | 0.07 |
| | ca % TOTAL | 100.00 | 100.00 | 100.00 | 100.00 |
| an % | $O^{2-}$ | 83.77 | 85.60 | 86.03 | 84.06 |
| | $F^-$ | 16.23 | 14.40 | 13.97 | 15.94 |
| | an % TOTAL | 100.00 | 100.00 | 100.00 | 100.00 |
| $P^{5+} + Al^{3+}$ | | 55.66 | 55.87 | 53.06 | 55.87 |
| $\Sigma AE^{2+}(=Mg^{2+} + Ca^{2+} + Sr^{2+} + Ba^{2+} + Zn^{2+})$ | | 40.56 | 40.71 | 42.76 | 41.47 |
| $\Sigma RE^{3+}(=Y^{3+} + La^{3+} + Gd^{3+})$ | | 1.54 | 1.16 | 1.16 | 0.41 |
| $\Sigma TM^{n+}(=Ti^{4+} + Zr^{4+} + Nb^{5+} + Ta^{5+} + W^{6+})$ | | 2.18 | 2.19 | 2.95 | 2.19 |
| $P^{5+}/Al^{3+}$ | | 2.48 | 2.48 | 2.96 | 2.48 |
| $(Ba^{2+} + Zn^{2+})/(Mg^{2+} + Ca^{2+} + Sr^{2+})$ | | 6.83 | 6.83 | 5.78 | 6.97 |
| $(Li^+ + \Sigma AE^{2+} + \Sigma RE^{3+} + \Sigma TM^{n+})/(P^{5+} + Al^{3+})$ | | 0.80 | 0.79 | 0.88 | 0.79 |
| $\Sigma TM^{n+}/F^-$ | | 0.078 | 0.083 | 0.115 | 0.074 |
| $n_d$ | | 1.628725 | 1.630814 | 1.639290 | 1.627957 |
| $v_d$ | | 59.20 | 59.01 | 56.93 | 59.12 |
| $P_{g,F}$ | | 0.5544 | 0.5540 | 0.5570 | 0.5571 |

TABLE 7-continued

| | EXAMPLE 25 | EXAMPLE 26 | EXAMPLE 27 | EXAMPLE 28 |
|---|---|---|---|---|
| $\Delta P_{g,F}$ | 0.0087 | 0.0080 | 0.0077 | 0.0112 |
| SPECIFIC GRAVITY | 4.13 | 4.11 | 4.15 | 4.11 |
| $T_g$ (° C.) | 593 | 600 | 588 | 586 |
| DEVITRIFICATION RESISTANCE | A | B | A | B |

TABLE 8

| | | EXAMPLE 29 | EXAMPLE 30 | EXAMPLE 31 | EXAMPLE 32 |
|---|---|---|---|---|---|
| ca % | $B^{3+}$ | 0.00 | 0.00 | 0.00 | 0.00 |
| | $P^{5+}$ | 39.65 | 40.11 | 36.85 | 36.07 |
| | $Al^{3+}$ | 13.42 | 12.03 | 11.32 | 11.08 |
| | $Li^{+}$ | 0.00 | 0.00 | 0.00 | 0.00 |
| | $Na^{+}$ | 0.00 | 0.00 | 0.00 | 0.00 |
| | K+ | 0.00 | 0.00 | 0.00 | 0.00 |
| | $Mg^{2+}$ | 3.43 | 2.88 | 11.15 | 10.91 |
| | $Ca^{2+}$ | 1.75 | 3.50 | 9.07 | 8.88 |
| | $Sr^{2+}$ | 0.00 | 0.00 | 0.00 | 0.00 |
| | $Ba^{2+}$ | 30.64 | 29.84 | 25.04 | 24.51 |
| | $Zn^{2+}$ | 6.95 | 7.04 | 0.00 | 0.00 |
| | $Y^{3+}$ | 0.00 | 0.00 | 2.26 | 2.21 |
| | $La^{3+}$ | 1.17 | 1.18 | 0.00 | 0.00 |
| | $Gd^{3+}$ | 0.00 | 0.00 | 0.00 | 0.00 |
| | $Ti^{4+}$ | 2.18 | 1.43 | 0.00 | 2.11 |
| | $Zr^{4+}$ | 0.76 | 0.38 | 0.00 | 0.00 |
| | $Nb^{5+}$ | 0.00 | 1.55 | 4.31 | 4.22 |
| | $Ta^{5+}$ | 0.00 | 0.00 | 0.00 | 0.00 |
| | $W^{6+}$ | 0.00 | 0.00 | 0.00 | 0.00 |
| | $Sb^{3+}$ | 0.07 | 0.07 | 0.00 | 0.00 |
| | ca % TOTAL | 100.00 | 100.00 | 100.00 | 100.00 |
| an % | $O^{2-}$ | 84.04 | 86.31 | 91.86 | 86.47 |
| | $F^{-}$ | 15.96 | 13.69 | 8.14 | 13.53 |
| | an % TOTAL | 100.00 | 100.00 | 100.00 | 100.00 |
| $P^{5+} + Al^{3+}$ | | 53.07 | 52.14 | 48.17 | 47.15 |
| $\Sigma AE^{2+}(=Mg^{2+} + Ca^{2+} + Sr^{2+} + Ba^{2+} + Zn^{2+})$ | | 42.76 | 43.26 | 45.26 | 44.30 |
| $\Sigma RE^{3+}(=Y^{3+} + La^{3+} + Gd^{3+})$ | | 1.17 | 1.18 | 2.26 | 2.21 |
| $\Sigma TM^{n+}(=Ti^{4+} + Zr^{4+} + Nb^{5+} + Ta^{5+} + W^{6+})$ | | 2.94 | 3.36 | 4.31 | 6.33 |
| $P^{5+}/Al^{3+}$ | | 2.95 | 3.33 | 3.25 | 3.25 |
| $(Ba^{2+} + Zn^{2+})/(Mg^{2+} + Ca^{2+} + Sr^{2+})$ | | 7.26 | 5.78 | 1.24 | 1.24 |
| $(Li^{+} + \Sigma AE^{2+} + \Sigma RE^{3+} + \Sigma TM^{n+})/(P^{5+} + Al^{3+})$ | | 0.88 | 0.92 | 1.08 | 1.12 |
| $\Sigma TM^{n+}/F^{-}$ | | 0.100 | 0.134 | 0.302 | 0.258 |
| $n_d$ | | 1.633534 | 1.641421 | 1.652399 | 1.669331 |
| $v_d$ | | 57.98 | 56.23 | 55.27 | 49.05 |
| $P_{g,F}$ | | 0.5571 | 0.5602 | 0.5607 | 0.5681 |
| $\Delta P_{g,F}$ | | 0.0094 | 0.0097 | 0.0087 | 0.0060 |
| SPECIFIC GRAVITY | | 4.17 | 4.16 | 3.98 | 4.03 |
| $T_g$ (° C.) | | 584 | 582 | 629 | 618 |
| DEVITRIFICATION RESISTANCE | | B | B | B | B |

TABLE 9

| | | EXAMPLE 33 | EXAMPLE 34 | EXAMPLE 35 |
|---|---|---|---|---|
| ca % | $B^{3+}$ | 0.00 | 0.00 | 0.00 |
| | $P^{5+}$ | 39.56 | 39.56 | 39.56 |
| | $Al^{3+}$ | 14.32 | 14.32 | 14.32 |
| | $Li^{+}$ | 2.20 | 2.20 | 2.20 |
| | $Na^{+}$ | 0.00 | 0.00 | 0.00 |
| | K+ | 0.00 | 0.00 | 0.00 |
| | $Mg^{2+}$ | 6.62 | 6.62 | 6.62 |
| | $Ca^{2+}$ | 0.50 | 3.54 | 3.54 |
| | $Sr^{2+}$ | 3.03 | 0.00 | 0.00 |
| | $Ba^{2+}$ | 30.24 | 30.24 | 30.24 |
| | $Zn^{2+}$ | 0.00 | 0.00 | 0.00 |
| | $Y^{3+}$ | 0.00 | 0.00 | 0.00 |
| | $La^{3+}$ | 1.15 | 0.00 | 1.15 |
| | $Gd^{3+}$ | 0.00 | 1.15 | 0.00 |
| | $Ti^{4+}$ | 2.30 | 2.30 | 0.78 |
| | $Zr^{4+}$ | 0.00 | 0.00 | 0.00 |
| | $Nb^{5+}$ | 0.00 | 0.00 | 0.00 |
| | $Ta^{5+}$ | 0.00 | 0.00 | 1.52 |

TABLE 9-continued

| | | EXAMPLE 33 | EXAMPLE 34 | EXAMPLE 35 |
|---|---|---|---|---|
| | $W^{6+}$ | 0.00 | 0.00 | 0.00 |
| | $Sb^{3+}$ | 0.07 | 0.07 | 0.07 |
| | ca % TOTAL | 100.00 | 100.00 | 100.00 |
| an % | $O^{2-}$ | 85.06 | 84.47 | 83.47 |
| | $F^-$ | 14.94 | 15.53 | 16.53 |
| | an % TOTAL | 100.00 | 100.00 | 100.00 |
| $P^{5+} + Al^{3+}$ | | 53.89 | 53.89 | 53.89 |
| $\Sigma AE^{2+}(=Mg^{2+} + Ca^{2+} + Sr^{2+} + Ba^{2+} + Zn^{2+})$ | | 40.40 | 40.40 | 40.40 |
| $\Sigma RE^{3+}(=Y^{3+} + La^{3+} + Gd^{3+})$ | | 1.15 | 1.15 | 1.15 |
| $\Sigma TM^{n+}(=Ti^{4+} + Zr^{4+} + Nb^{5+} + Ta^{5+} + W^{6+})$ | | 2.30 | 2.30 | 2.30 |
| $P^{5+}/Al^{3+}$ | | 2.76 | 2.76 | 2.76 |
| $(Ba^{2+} + Zn^{2+})/(Mg^{2+} + Ca^{2+} + Sr^{2+})$ | | 2.98 | 2.98 | 2.98 |
| $(Li^+ + \Sigma AE^{2+} + \Sigma RE^{3+} + \Sigma TM^{n+})/(P^{5+} + Al^{3+})$ | | 0.85 | 0.85 | 0.85 |
| $\Sigma TM^{n+}/F^-$ | | 0.085 | 0.085 | 0.085 |
| $n_d$ | | 1.627485 | 1.627027 | 1.617870 |
| $v_d$ | | 59.26 | 59.18 | 60.92 |
| $P_{g,F}$ | | 0.5553 | 0.5555 | 0.5508 |
| $\Delta P_{g,F}$ | | 0.0097 | 0.0098 | 0.0079 |
| SPECIFIC GRAVITY | | 4.10 | 4.07 | 4.12 |
| $T_g$ (° C.) | | 583 | 583 | 582 |
| DEVITRIFICATION RESISTANCE | | B | A | A |

TABLE 10

| | | EXAMPLE 36 | EXAMPLE 37 |
|---|---|---|---|
| ca % | $B^{3+}$ | 0.00 | 0.00 |
| | $P^{5+}$ | 39.56 | 39.56 |
| | $Al^{3+}$ | 14.32 | 14.32 |
| | $Li^+$ | 2.20 | 2.20 |
| | $Na^+$ | 0.00 | 0.00 |
| | K+ | 0.00 | 0.00 |
| | $Mg^{2+}$ | 6.62 | 7.12 |
| | $Ca^{2+}$ | 3.54 | 0.00 |
| | $Sr^{2+}$ | 0.00 | 0.00 |
| | $Ba^{2+}$ | 30.24 | 30.24 |
| | $Zn^{2+}$ | 0.00 | 3.03 |
| | $Y^{3+}$ | 0.00 | 0.00 |
| | $La^{3+}$ | 1.15 | 1.15 |
| | $Gd^{3+}$ | 0.00 | 0.00 |
| | $Ti^{4+}$ | 0.78 | 2.30 |
| | $Zr^{4+}$ | 0.00 | 0.00 |
| | $Nb^{5+}$ | 0.00 | 0.00 |
| | $Ta^{5+}$ | 0.00 | 0.00 |
| | $W^{6+}$ | 1.52 | 0.00 |
| | $Sb^{3+}$ | 0.07 | 0.07 |
| | ca % TOTAL | 100.00 | 100.00 |
| an % | $O^{2-}$ | 82.47 | 85.06 |
| | $F^-$ | 17.53 | 14.94 |
| | an % TOTAL | 100.00 | 100.00 |
| $P^{5+} + Al^{3+}$ | | 53.89 | 53.89 |
| $\Sigma AE^{2+}(=Mg^{2+} + Ca^{2+} + Sr^{2+} + Ba^{2+} + Zn^{2+})$ | | 40.40 | 40.40 |
| $\Sigma RE^{3+}(=Y^{3+} + La^{3+} + Gd^{3+})$ | | 1.15 | 1.15 |
| $\Sigma TM^{n+}(=Ti^{4+} + Zr^{4+} + Nb^{5+} + Ta^{5+} + W^{6+})$ | | 2.30 | 2.30 |
| $P^{5+}/Al^{3+}$ | | 2.76 | 2.76 |
| $(Ba^{2+} + Zn^{2+})/(Mg^{2+} + Ca^{2+} + Sr^{2+})$ | | 2.98 | 4.67 |
| $(Li^+ + \Sigma AE^{2+} + \Sigma RE^{3+} + \Sigma TM^{n+})/(P^{5+} + Al^{3+})$ | | 0.85 | 0.85 |
| $\Sigma TM^{n+}/F^-$ | | 0.085 | 0.085 |
| $n_d$ | | 1.627437 | 1.628623 |
| $v_d$ | | 60.08 | 58.69 |
| $P_{g,F}$ | | 0.5530 | 0.5565 |
| $\Delta P_{g,F}$ | | 0.0087 | 0.0100 |
| SPECIFIC GRAVITY | | 4.12 | 4.09 |
| $T_g$ (° C.) | | 586 | 573 |
| DEVITRIFICATION RESISTANCE | | A | B |

TABLE 11

| | | COMPARATIVE EXAMPLE 1 | COMPARATIVE EXAMPLE 2 | COMPARATIVE EXAMPLE 3 | COMPARATIVE EXAMPLE 4 |
|---|---|---|---|---|---|
| ca % | $B^{3+}$ | 0.00 | 18.98 | 0.00 | 0.00 |
| | $P^{5+}$ | 39.01 | 42.28 | 38.16 | 37.94 |
| | $Al^{3+}$ | 11.37 | 2.81 | 2.76 | 11.66 |
| | $Li^{+}$ | 1.00 | 1.26 | 0.00 | 0.00 |
| | $Na^{+}$ | 18.34 | 0.00 | 0.00 | 0.00 |
| | K+ | 1.00 | 0.00 | 0.00 | 0.00 |
| | $Mg^{2+}$ | 12.70 | 3.46 | 15.06 | 11.48 |
| | $Ca^{2+}$ | 8.40 | 8.87 | 8.87 | 9.34 |
| | $Sr^{2+}$ | 0.00 | 0.00 | 0.00 | 0.00 |
| | $Ba^{2+}$ | 6.19 | 13.40 | 24.49 | 25.78 |
| | $Zn^{2+}$ | 0.00 | 5.12 | 0.00 | 0.00 |
| | $Y^{3+}$ | 0.00 | 0.00 | 2.21 | 2.32 |
| | $La^{3+}$ | 0.00 | 0.00 | 0.00 | 0.00 |
| | $Gd^{3+}$ | 0.00 | 0.00 | 0.00 | 0.00 |
| | $Ti^{4+}$ | 0.00 | 0.00 | 2.98 | 1.48 |
| | $Zr^{4+}$ | 0.00 | 0.00 | 0.00 | 0.00 |
| | $Nb^{5+}$ | 2.00 | 1.89 | 5.46 | 0.00 |
| | $Ta^{5+}$ | 0.00 | 1.89 | 0.00 | 0.00 |
| | $W^{6+}$ | 0.00 | 0.00 | 0.00 | 0.00 |
| | $Sb^{3+}$ | 0.00 | 0.05 | 0.00 | 0.00 |
| | ca % TOTAL | 100.00 | 100.00 | 100.00 | 100.00 |
| an % | $O^{2-}$ | 70.78 | 98.26 | 86.61 | 70.59 |
| | $F^{-}$ | 29.22 | 1.74 | 13.39 | 29.41 |
| | an % TOTAL | 100.00 | 100.00 | 100.00 | 100.00 |
| $P^{5+} + Al^{3+}$ | | 50.38 | 45.09 | 40.92 | 49.60 |
| $\Sigma AE^{2+}(=Mg^{2+} + Ca^{2+} + Sr^{2+} + Ba^{2+} + Zn^{2+})$ | | 27.29 | 30.85 | 48.43 | 46.60 |
| $\Sigma RE^{3+}(=Y^{3+} + La^{3+} + Gd^{3+})$ | | 0.00 | 0.00 | 2.21 | 2.32 |
| $\Sigma TM^{n+}(=Ti^{4+} + Zr^{4+} + Nb^{5+} + Ta^{5+} + W^{6+})$ | | 2.00 | 3.78 | 8.44 | 1.48 |
| $P^{5+}/Al^{3+}$ | | 3.43 | 15.07 | 13.81 | 3.25 |
| $(Ba^{2+} + Zn^{2+})/(Mg^{2+} + Ca^{2+} + Sr^{2+})$ | | 0.29 | 1.50 | 1.02 | 1.24 |
| $(Li^{+} + \Sigma AE^{2+} + \Sigma RE^{3+} + \Sigma TM^{n+})/(P^{5+} + Al^{3+})$ | | 0.60 | 0.80 | 1.44 | 1.02 |
| $\Sigma TM^{n+}/F^{-}$ | | 0.037 | 1.200 | 0.344 | 0.026 |
| $n_d$ | | 1.528720 | 1.628546 | 1.664794 | 1.583235 |
| $V_d$ | | 64.95 | 55.61 | 46.90 | 63.52 |
| $P_{g,F}$ | | 0.5442 | 0.5522 | 0.5747 | 0.5535 |
| $\Delta P_{g,F}$ | | 0.0078 | 0.0007 | 0.0091 | 0.0148 |
| SPECIFIC GRAVITY | | 3.15 | 3.54 | 3.96 | 3.07 |
| $T_g$ (° C.) | | 424 | 569 | 584 | 526 |
| DEVITRIFICATION RESISTANCE | | C | A | C | A |

It was confirmed that the optical glass in the present example had a high refractive index, low dispersion, and high abnormal dispersibility. It was also confirmed that the optical glass had excellent devitrification resistance, and was extremely useful for suppressing a stria during glass manufacturing, particularly, during melting and molding.

When the glass transition temperature ($T_g$) is high, vitrification is liable to be quick. Thus, a high glass transition temperature ($T_g$) is useful for suppressing a stria. Meanwhile, a low glass transition temperature ($T_g$) has an advantage that a glass can be suitably used as a molding glass material with small damage to a mold caused by heat. Thus, when there are such needs for the optical glass in the present example, as adjustment made to shift the glass transition temperature ($T_g$) to a low temperature side by introduction of $Li^{+}$ is also expected.

What is claimed is:

1. An optical glass, comprising:

by mol % of cation,

30% to 45% of a percentage content of $P^{5+}$;

13.41% to 20% of a percentage content of $Al^{3+}$;

20% to 40% of a percentage content of $Ba^{2+}$;

at least one kind of $Li^{+}$ and $Ti^{4+}$;

a total percentage content of $Y^{3+}$, $La^{3+}$, and $Gd^{3+}$ ($\Sigma RE^{3+}$) is from 0% to 1.92%; and by anion %, 75% to 95% of an $O^{2-}$ component;

5% to 14.94% of an $F^{-}$ component; and by mol % of cation for a cation component and by mol % of anion for an anion component, a proportion of $Ti^{4+}$, $Zr^{4+}$, $Nb^{5+}$, $Ta^{5+}$, and $W^{6+}$ ($\Sigma TM^{n+}$) to F- ($\Sigma TM^{n+}/F^{-}$) is from 0.05 to 0.35, a refractive index ($n_d$) falls within a range from 1.61 to 1.70, an abbe number ($v_d$) falls within a range from 40 to 65, a partial dispersion ratio ($P_{g,F}$) is from 0.5530 to 0.570.

2. The optical glass according to claim 1, further comprising, by mol % of cation, 1% to 6% of a percentage content of $Li^{+}$.

3. The optical glass according to claim 2, further comprising, by mol % of cation, 0% to 6% of a percentage content of $Ti^{4+}$.

4. The optical glass according to claim 1, further comprising, by mol % of cation, 0.5% to 6% of a percentage content of $Ti^{4+}$.

5. The optical glass according to claim 4, further comprising, by mol % of cation, 0% to 6% of a percentage content of $Li^{+}$.

6. The optical glass according to claim 1, further comprising, by mol % of cation, 0% to 15% of a percentage content of $Mg^{2+}$;

0% to 20% of a percentage content of $Ca^{2+}$;

0% to 20% of a percentage content of $Sr^{2+}$;

0% to 15% of a percentage content of $Zn^{2+}$;

0% to 6% of a percentage content of $Y^{3+}$;

0% to 6% of a percentage content of $La^{3+}$;

0% to 6% of a percentage content of $Gd^{3+}$;

0% to 3% of a percentage content $Zr^{4+}$;

0% to 8% of a percentage content of $Nb^{5+}$;

0% to 4% of a percentage content of $Ta^{5+}$; and

0% to 6% of a percentage content of $W^{6+}$.

7. The optical glass according to claim 1, wherein by mol % of cation, a total percentage content of $P^{5+}$ and $Al^{3+}$ ($P^{5+}$+$Al^{3+}$) is from 40% to 65%.

8. The optical glass according to claim 1, wherein by mol % of cation, a total percentage content of $Mg^{2+}$, $Ca^{2+}$, $Sr^{2+}$, $Ba^{2+}$, and $Zn^{2+}$ ($\Sigma AE^{2+}$) is from 35% to 50%.

9. The optical glass according to claim 1, wherein by mol % of cation, a total percentage content of $Ti^{4+}$, $Zr^{4+}$, $Nb^{5+}$, $Ta^{5+}$, and $W^{6+}$ ($\Sigma TM^{n+}$) is more than 0% to 10%.

10. The optical glass according to claim 1, wherein by mol % of cation, a proportion of a percentage content of $P^{5+}$ to a percentage content of $Al^{3+}$ ($P^{5+}/Al^{3+}$) is from 1.5 to 4.5.

11. The optical glass according to claim 1, wherein by mol % of cation, a proportion of a percentage content of $Ba^{2+}$ and $Zn^{2+}$ to a total percentage content of $Mg^{2+}$, $Ca^{2+}$, and $Sr^{2+}$ $((Ba^{2+}+Zn^{2+})/(Mg^{2+}+Ca^{2+}+Sr^{2+}))$ is from 0.5 to 10.

12. The optical glass according to claim 1, wherein, by mol % of cation, a proportion of a total percentage content of $Li^{+}$, $Mg^{2+}$, $Ca^{2+}$, $Sr^{2+}$, $Ba^{2+}$, $Zn^{2+}$, $Y^{3+}$, $La^{3+}$, $Gd^{3+}$, $Ti^{4+}$, $Zr^{4+}$, $Nb^{5+}$, $Ta^{5+}$, and $W^{6+}$ to a total percentage content of $P^{5+}$ and $Al^{3+}$ $((Li^{+}+\Sigma AE^{2+}+\Sigma RE^{3+}+\Sigma TM^{n+})/(P^{5+}+Al^{3+}))$ is preferably from 0.7 to 1.3.

13. The optical glass according to claim 1, wherein $\Delta P_{g,F}$ is from 0.005 to 0.015.

14. The optical glass according to claim 1, wherein specific gravity ($S_g$) is from 3.90 to 4.20.

15. The optical glass according to claim 1, wherein a glass transition temperature ($T_g$) is 650 degrees Celsius or lower.

* * * * *